United States Patent
Asada et al.

(10) Patent No.: US 12,298,388 B2
(45) Date of Patent: May 13, 2025

(54) TARGET DETECTION DEVICE AND TARGET DETECTION METHOD

(71) Applicant: Furuno Electric Co., Ltd., Nishinomiya (JP)

(72) Inventors: Yasunobu Asada, Auckland (NZ); Shinya Tanimura, Auckland (NZ)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 335 days.

(21) Appl. No.: 17/542,494

(22) Filed: Dec. 6, 2021

(65) Prior Publication Data
US 2022/0260711 A1    Aug. 18, 2022

(30) Foreign Application Priority Data
Feb. 15, 2021  (EP) .................................. 21157026
Nov. 9, 2021   (EP) .................................. 21207161

(51) Int. Cl.
*G01S 15/04*    (2006.01)
*G01S 13/04*    (2006.01)

(52) U.S. Cl.
CPC .............. *G01S 15/04* (2013.01); *G01S 13/04* (2013.01)

(58) Field of Classification Search
CPC .................................. G01S 1/802; G01S 1/08
See application file for complete search history.

(56) References Cited

U.S. PATENT DOCUMENTS

| | | | | |
|---|---|---|---|---|
| 3,891,961 A | * | 6/1975 | Haisfield | H04B 11/00 367/1 |
| 6,678,210 B2 | | 1/2004 | Rowe | |
| 11,131,764 B2 | * | 9/2021 | Takayama | G01S 13/583 |
| 11,211,702 B1 | * | 12/2021 | Mahanfar | H01Q 5/42 |
| 11,531,083 B2 | * | 12/2022 | Stokes | G01S 7/2813 |
| 2004/0008124 A1 | * | 1/2004 | Schaefer | H04B 13/02 340/850 |

(Continued)

FOREIGN PATENT DOCUMENTS

| | | | |
|---|---|---|---|
| JP | 60-262076 A | 12/1985 | |
| JP | H085728 A | * 6/1996 | ............. G01S 15/89 |

(Continued)

OTHER PUBLICATIONS

Wang et al., "An Overview of Time/Frequency Modulated Array Processing", Mar. 2017, IEEE, vol. 11 No. 2, pp. 228-246 (Year: 2017).*

(Continued)

*Primary Examiner* — Vladimir Magloire
*Assistant Examiner* — Eric K Hodac
(74) *Attorney, Agent, or Firm* — XSENSUS LLP

(57) ABSTRACT

A target detection device is provided. The target detection device includes a transmission array having a plurality of transmission transducer elements. The target detection device further includes a signal generator. The signal generator generates a plurality of transmission signals. The signal generator further changes a phase of a base signal by a phase shift amount that changes over time for generating each of the plurality of transmission signals. Furthermore, the signal generator provides inputs to each transmission transducer element of the plurality of transmission transducer elements with one of the plurality of transmission signals.

20 Claims, 25 Drawing Sheets

(56) References Cited

U.S. PATENT DOCUMENTS

| | | | |
|---|---|---|---|
| 2008/0043574 A1* | 2/2008 | Rooney, III | G01S 7/524 |
| | | | 367/87 |
| 2013/0016586 A1* | 1/2013 | Craig | G01S 15/96 |
| | | | 367/107 |
| 2017/0016985 A1* | 1/2017 | Takizawa | G01S 13/84 |
| 2017/0128046 A1* | 5/2017 | Kim | G01S 15/8927 |
| 2017/0144190 A1* | 5/2017 | Hoshi | H04R 1/40 |
| 2017/0307648 A1* | 10/2017 | Kotake | G01S 17/95 |

FOREIGN PATENT DOCUMENTS

| | | | | |
|---|---|---|---|---|
| JP | 08248131 A | * | 9/1996 | G01S 17/42 |
| WO | WO-2019026434 A1 | * | 2/2019 | A61B 8/14 |

OTHER PUBLICATIONS

Gabbay et al., "Phased array beamforming using nonlinear oscillators", Jan. 24, 2012, UCSD Synthetic Biology Institute, vol. 5559, pp. 146-155 (Year: 2012).*

Wang et al., "An Overview on Time/Frequency Modulated Array Processing", IEEE Journal of Selected Topics in Signal Processing, vol. 11, No. 2, Mar. 2017, pp. 228-246.

European Search Opinion received for EP Application No. 21157026.2, 7 pages.

\* cited by examiner

TARGET DETECTION DEVICE AND TARGET DETECTION METHOD

CROSS-REFERENCE TO RELATED APPLICATIONS

This application claims priority under 35 U.S.C. § 119 to European Patent Application No. EP21207161.7 filed Nov. 9, 2021, and European Patent Application No. EP21157026.2 filed Feb. 15, 2021, which are hereby incorporated by reference in their entirety.

TECHNICAL FIELD

An example embodiment of the present disclosure generally relates to a target detection device for detecting targets in a water body or in air.

BACKGROUND

With advancements in the field of marine sonar technology, nowadays marine sonars are used for a number of marine activities. For example, the marine sonars are used in surveillance systems for visualizing underwater conditions by detecting targets such as shipwrecks, fish schools, a seabed, etc. Some commonly known marine sonars transmit a transmission wave using a two dimensional (2D) array and detect the targets based on a reception wave corresponding to the transmission wave. However, the use of a 2D array makes the marine sonars expensive because of the large number of elements in the 2D array. To that end, some other marine sonars use a T-shaped array, where a transmission array and a reception array are perpendicularly arranged to each other. However, the use of T-shaped array does not allow visualizing the underwater conditions in a single transmission. For instance, the transmission wave transmitted by the T-shaped array may be a fan beam. Therefore, the marine sonars that use T-shaped array need to transmit the transmission wave multiple times by changing direction of the transmission wave for visualizing the underwater conditions. Accordingly, the marine sonars that use T-shaped array consume more power, and are inefficient thereby making the visualizing task more challenging. A similar problem may arise with a radar that detects targets in air.

A prior art document U.S. Pat. No. 6,678,210 relates to a sonar array forming multiple transmit and/or receive acoustic beams by a frequency beam forming technique. According to this method, since beams of different frequencies are formed in each direction of the transmission array direction by single transmission, it is possible to perform separation in the transmission array direction by performing band separation at the time of receiving. However, since frequency and range of direction of the beam are closely related, these cannot be set independently. So, when a wide range of direction is needed, the frequency range needs to be wide. However, it is complex and expensive to make a Sonar that handles a wide frequency range.

Accordingly, there is a need for a target detection device and a target detection method for detecting the targets in an efficient and feasible manner such that the visualization of the target and/or its environment is achieved in a single transmission.

SUMMARY

In order to solve the foregoing problem, the present invention provides a target detection device. The target detection device comprises a transmission array having a plurality of transmission transducer elements; and a signal generator configured to: generate a plurality of transmission signals, wherein to generate each transmission signal of the plurality of transmission signals, the signal generator is further configured to change a phase of a base signal by a phase shift amount that changes over time; and input to each transmission transducer element of the plurality of transmission transducer elements a corresponding generated transmission signal of the plurality of transmission signals.

In additional target detection device embodiments, the target detection device further comprises a reception array having a plurality of reception elements. The reception array is configured to receive a reception wave from a target. Each reception element is configured to convert the reception wave into a corresponding reception signal. The target detection device further comprises a processing circuitry configured to calculate an incoming direction of the reception wave in a first dimension by performing beamforming based on the received reception signals. The processing circuitry is further configured to: extract a plurality of different frequency components from the reception signals, wherein each frequency component corresponds to a different incoming direction in a second dimension, wherein the second dimension is different than the first dimension; and calculate an incoming direction of the reception wave in the second dimension, based on the extracted plurality of different frequency components.

In another aspect, the present invention provides a target detection method. The target detection method comprises: generating a plurality of transmission signals, wherein for generating each transmission signal of the plurality of transmission signals the target detection method further comprises phase shifting a phase of a base signal by a phase shift amount that changes over time; inputting a corresponding generated transmission signal of the plurality of transmission signals into one of a plurality of transmission transducer elements; and transmitting a transmission wave from the plurality of transmission transducer elements.

In accordance with various embodiments, the present disclosure proposes the target detection device for detecting the targets such that the visualization of the underwater conditions is achieved in single transmission. To that end, the target detection device transmits a transmission wave as beams of different emission directions at different frequencies and at different time instances. Thereby the target detection device transmits the transmission wave in a detection range and enables to visualize the underwater or air conditions in single transmission. For example, the target detection device may allow 3D visualization of a target and/or its environment. In order to transmit the transmission wave as the beams of different emission directions at different frequencies and at different time instances, the target detection device generates each of the plurality of transmission signals by phase shifting the phase of the base signal by a phase shift amount that changes with time. As each transmission signal is generated by phase shifting the phase of the base signal by the phase shift amount that changes with time, the target detection device enables to control the detection range of the transmission wave using the phase shift amount applied to phase shift the base signal. Thereby, a frequency range of signals inputted to a transmission array is not dependent on the detection range of the transmission wave, as the detection range of transmission wave is controlled by the phase shift amount applied to the base signal. As the frequency range is not depending on the detection range of the transmission wave, the target detection device enables to select a frequency range of the base signal independently without considering the detection range of the transmission wave. For instance, a base signal of a small frequency range (or a constant frequency signal) may be selected for transmitting the transmission wave. To that end, the target detection device detects targets in single transmission with a narrow frequency band that is similar to the frequency range of the base signal.

However, in currently available technologies, the detection range is completely dependent on the frequency range of the signals inputted to the transmission array. For instance, in the currently available technologies, a detection range of about 20 degree (e.g., 10 degree to 30 degree) is achieved by designing signals from a wide frequency band of about 200 kHz. Thereby, the currently available technologies demand for additional circuitry and a transmission array, which are capable of handling a wide frequency range.

In contrast, the target detection device of the present disclosure may not require the additional circuitry and the transmission array capable of handling the wide frequency range, due to the fact that the frequency range of the base signal is independent of the detection range. Thereby cost of the target detection device is low, in comparison to the currently available technologies.

The foregoing summary is illustrative only and is not intended to be in any way limiting. In addition to the illustrative aspects, embodiments, and features described above, further aspects, embodiments, and features will become apparent by reference to the drawings and the following detailed description.

According to this invention, a target detection device and a target detection method is provided. The invention enables the target detection device to detect targets in a single transmission by transmitting a transmission wave as beams of different emission directions at different frequencies and at different time instances. The invention further enables the target detection device to control a detection range of the transmission wave by generating each of a plurality of transmission signals by phase shifting a phase of a base signal by a phase shift amount that changes with time. For instance, the target detection device controls the detection range of the transmission wave by phase shift amount applied to the base signal. Furthermore, the target detection device enables to select a frequency range of the base signal independently without considering the detection range of the transmission wave, as the detection range of the transmission wave is controlled by the phase shift amount applied to the base signal. Furthermore, the invention enables target detection device to detect targets in a single transmission by using a narrow frequency band that is similar to the frequency range of the base signal.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1:
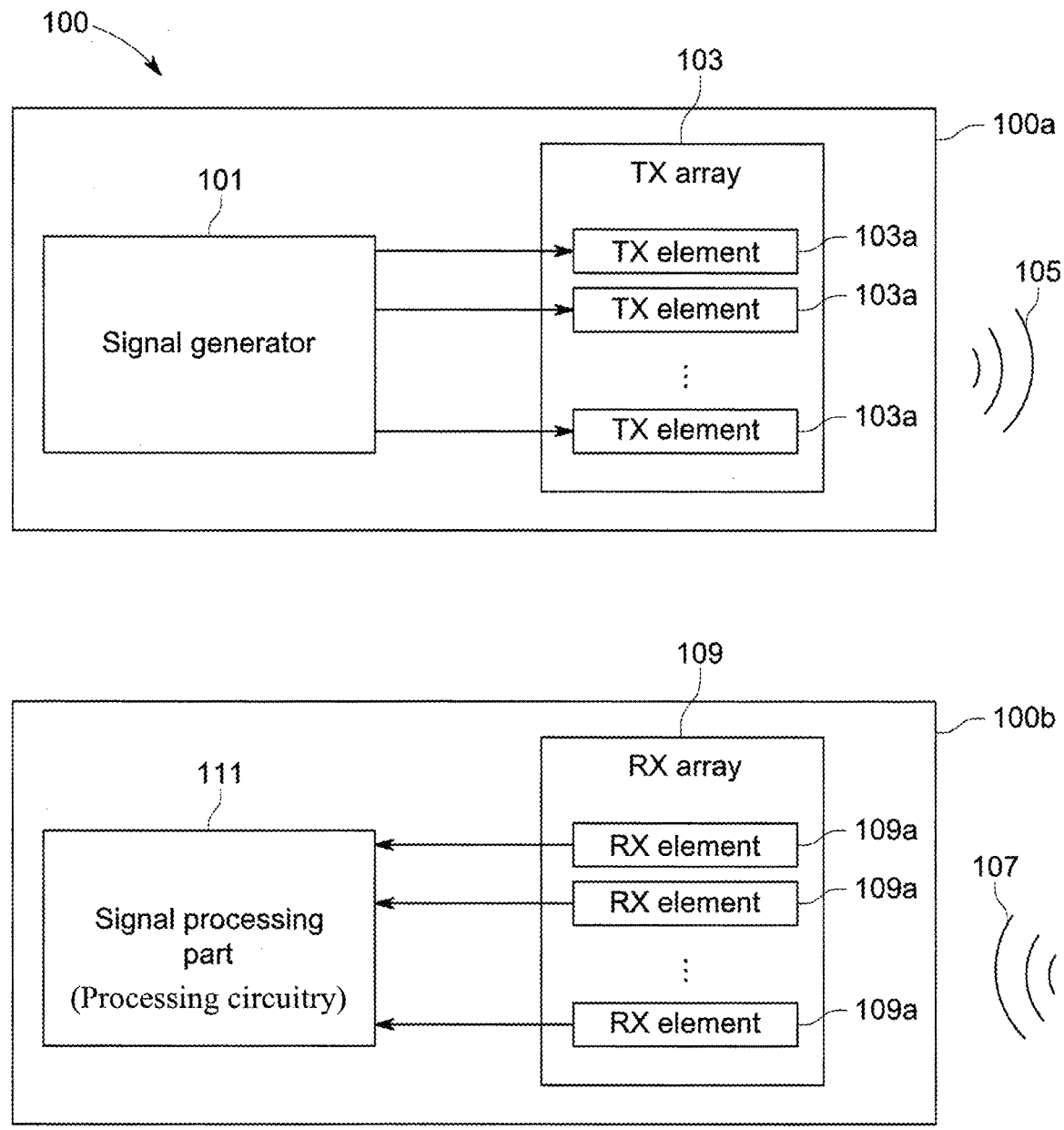
FIG. 1 illustrates a block diagram of a target detection device for detecting targets, in accordance with an example embodiment of the present invention.

In the following description, for purposes of explanation, numerous specific details are set forth in order to provide a thorough understanding of the present disclosure. It will be apparent, however, to one skilled in the art that the present disclosure may be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Further, the terms "processor", "controller" and "processing circuitry" and similar terms may be used interchangeably to refer to the processor capable of processing information in accordance with embodiments of the present invention. Further, the terms "electronic equipment", "electronic devices" and "devices" are used interchangeably to refer to electronic equipment monitored by the system in accordance with embodiments of the present invention. Thus, use of any such terms should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

As used in this specification and claims, the terms "for example" "for instance" and "such as", and the verbs "comprising," "having," "including" and their other verb forms, when used in conjunction with a listing of one or more components or other items, are each to be construed as open ended, meaning that that the listing is not to be considered as excluding other, additional components or items. Other terms are to be construed using their broadest reasonable meaning unless they are used in a context that requires a different interpretation.

One of the objectives of the present disclosure is to detect targets such that visualization of the underwater conditions is achieved in single transmission. To that end, a transmission wave may be transmitted as the beams of different emission directions at different frequencies and at different time instances. Thereby the transmission wave is propagated in a detection range which allows visualizing the underwater conditions in single transmission. In order to transmit the transmission wave as the beams of different emission directions at different frequencies and at different time instances, each of the plurality of transmission signals may be generated by phase shifting the phase of the base signal by the phase shift amount that changes with time. Accordingly, the transmission wave may be controlled to propagate in the detection range by the phase shift amount applied to the base signal. Thereby, a frequency range of the base signal may be selected independently without considering the detection range of the transmission wave. For instance, a base signal of a small frequency range may be selected for transmitting the transmission wave. Therefore, the targets may be detected for visualizing the underwater conditions in single transmission with a narrow frequency band that is similar to the frequency range of the base signal. In this way, the target detection device may detect the targets for visualizing the underwater conditions in single transmission. Further, an overview of the target detection device for detecting the targets is provided below with reference to FIG. 1.

FIG. 1 illustrates a block diagram of a target detection device 100 for detecting the targets, in accordance with an example embodiment of the present invention. In an example embodiment, the target detection device 100 may be installed at a vessel navigating in the water body. In an example embodiment, the target detection device 100 may be a sonar that is used to detect targets in the water body. In an embodiment, the target detection device 100 may be a radar that is used to detect targets above the water body. The targets may include one or more of fish schools, shipwrecks, a seabed and the like.

The target detection device 100 may include a transmission part 100a and a reception part 100b. The transmission part 100a may be configured to transmit a transmission wave 105 for detecting the targets. In an example embodiment, the target detection device 100 may transmit the transmission wave 105 as beams of different emission directions at different frequencies at different time instances, to detect the targets. For instance, the transmission wave 105 may be the beams of different frequencies and different emission directions with time. To that end, the transmission part 100a may include a signal generator 101 and a transmission array 103. The signal generator 101 may be configured to generate a plurality of transmission signals (mathematically represented as $s_n(t)$) and may be further configured to input the generated plurality of transmission signals $s_n(t)$ into the transmission array 103. The transmission array 103 (also referred to as a transmitting system 103) may comprise a plurality of transmission elements 103a. The plurality of transmission elements 103a may be transmission transducers that convert the plurality of transmission signals $s_n(t)$ into the transmission wave 105. To that end, the plurality of transmission elements 103a may be referred to as a plurality of transmission transducer elements (103a). The transmission array 103 is for example a 1D array (linear array), in which the plurality of transmission elements 103a is arranged in a line, preferably a straight line. Without any limitation to the straight line arrangement of elements, the plurality of transmission elements 103a may also be arranged along a curved line.

The reception part 100b may be configured to receive a reception wave 107. In an example embodiment, the reception wave 107 may be a wave reflected from the at least one target, in response to transmitting the transmission wave 105. The reception part 100b may comprise a reception array 109 and a signal processing part 111. The reception array 109 (also referred to as a reception system 109) may comprise a plurality of reception elements 109a. The plurality of reception elements 109a may be reception transducers that convert the reception wave 107 into a plurality of reception signals. The reception array is for example a 1D array (linear array), in which the plurality of reception elements 109a is arranged in a line which is preferably straight but may be curved. The signal processing part 111 (also referred to as a processing circuitry 111) may be configured to receive the plurality of reception signals and may be further configured to separate echoes (e.g., beams reflected from the at least one target) in a first dimension (e.g., a horizontal direction) and in a second dimension (e.g., a vertical direction), based on the reception signals. Further, the signal processing part 111 may be configured to generate visual data of the detected target for visualizing the underwater conditions. In an example embodiment, the visual data may be a three dimensional (3D) view of the detected target.

Additionally, the target detection device 100 may comprise a controller (not shown in this figure). The controller may be a micro-controller based circuit. The controller may further control the signal generator 101 to generate the plurality of transmission signal $s_n(t)$ such that the transmission wave 105 generated from the plurality of transmission signal $s_n(t)$ is propagated as the beams of different emission directions at different frequencies and at different time instances. The transmission part 100a for transmitting the transmission wave 105 (as the beams of different frequencies and different emission directions with time) is further explained in the detailed description of FIG. 2A.

Figure 2A:
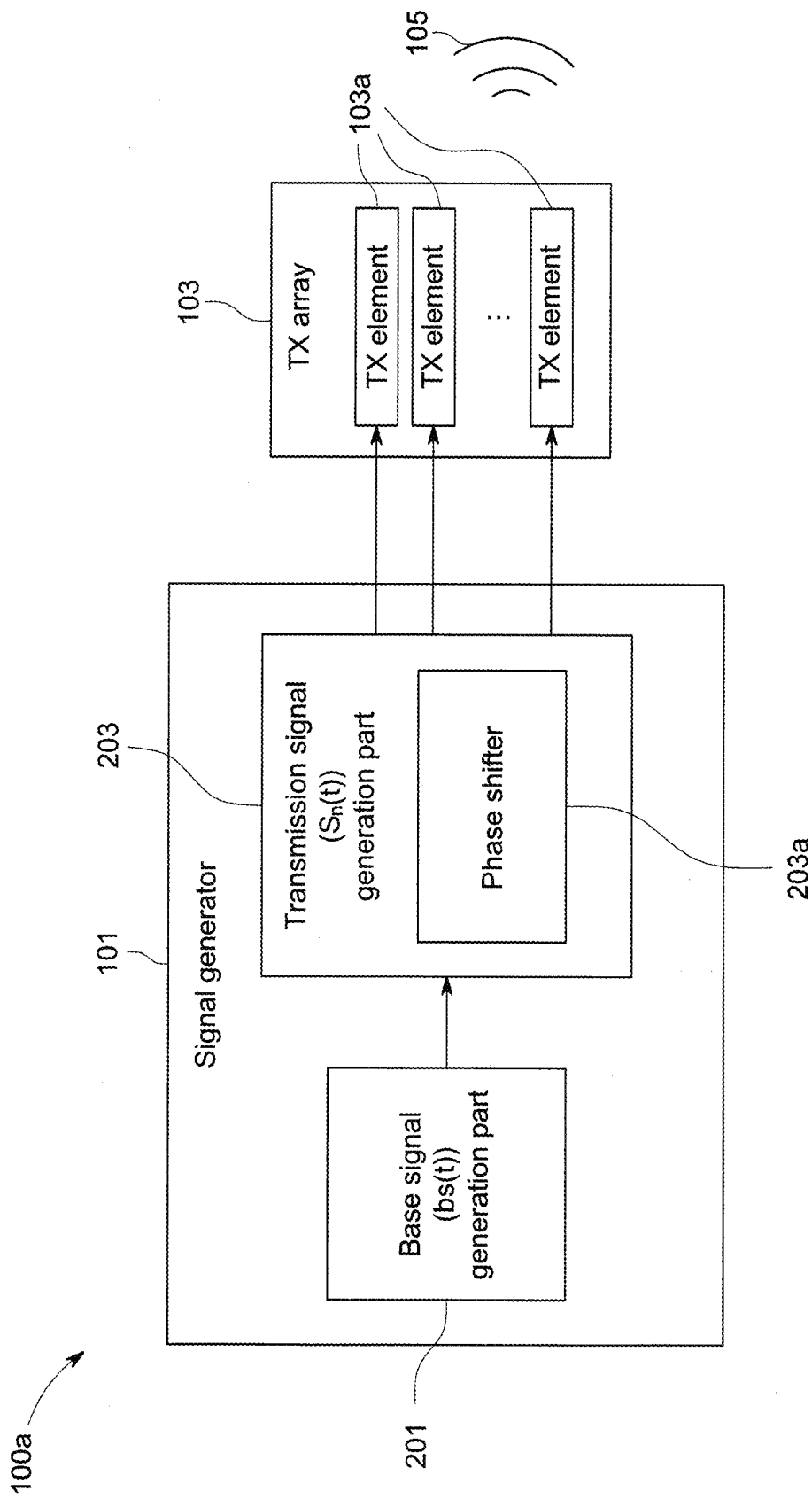
FIG. 2A illustrates a block diagram of a transmission part of the target detection device for transmitting a transmission wave, in accordance with an example embodiment of the present invention.

FIG. 2A illustrates a block diagram of the transmission part 100a of the target detection device 100 for transmitting the transmission wave 105, in accordance with an example embodiment of the present invention. As illustrated in FIG. 2A, the transmission part 100a may include the signal generator 101 and the transmission array 103. The signal generator 101 may be configured to generate the plurality of transmission signals $s_n(t)$. In an example embodiment, the signal generator 101 may include a base signal generation part 201 and a transmission signal generation part 203 for generating the plurality of transmission signals $s_n(t)$. The base signal generation part 201 may be a signal generation circuit that is configured to generate a base signal (mathematically represented as bs(t)). The base signal bs(t) may be at least one of continuous wave (CW) and frequency modulated (FM) wave. Further, the FM wave may be at least one of linear FM wave (e.g., Chirp) and non-linear FM wave (e.g., hyperbolic FM wave). When the base signal bs(t) corresponds to the continuous wave, a carrier of the base signal bs(t) is a single frequency carrier. When the base signal bs(t) corresponds to the FM wave, a carrier of the base signal bs(t) is a FM carrier.

Further, the generated base signal bs(t) is inputted into the transmission signal generation part 203. The transmission signal generation part 203 may be configured to generate the plurality of transmission signals $s_n(t)$ from the base signal bs(t). In an example embodiment, the transmission signal generation part 203 may be configured to phase shift a phase of the base signal bs(t) by a phase shift amount that varies with time for generating each of the plurality of transmission signals $s_n(t)$. In other words, the transmission signal generation part 203 continuously calculates the phase shift amount that varies with time and phase shifts the phase of the base signal bs(t) in accordance with the calculated phase shift amount, for generating each of the plurality of transmission signals $s_n(t)$. The phase shift amount may be mathematically represented as $\theta_n(t)$. In an example embodiment, the transmission signal generation part 203 comprises a phase shifter 203a that is configured to calculate the phase shift amount $\theta_n(t)$ and phase shift, using the calculated phase shift amount $\theta_n(t)$, the phase of the base signal bs(t). In an example embodiment, the base signal generation part 201 and the transmission signal generation part 203 having the phase shifter 203a may be embodied within a processor. The processor may be embodied in a number of different ways. For example, the processor may be embodied as one or more of various hardware processing means such as a coprocessor, a microprocessor, a digital signal processor (DSP), a processing element with or without an accompanying DSP, or various other processing circuitry including integrated circuits such as, for example, an ASIC (application specific integrated circuit) and an FPGA (field programmable gate array), and the like. Further, a phase shift process executed by the transmission signal generation part 203 for generating the plurality of transmission signals $s_n(t)$ from the base signal bs(t) is further explained in the detailed description of FIG. 2B.

Figure 2B:
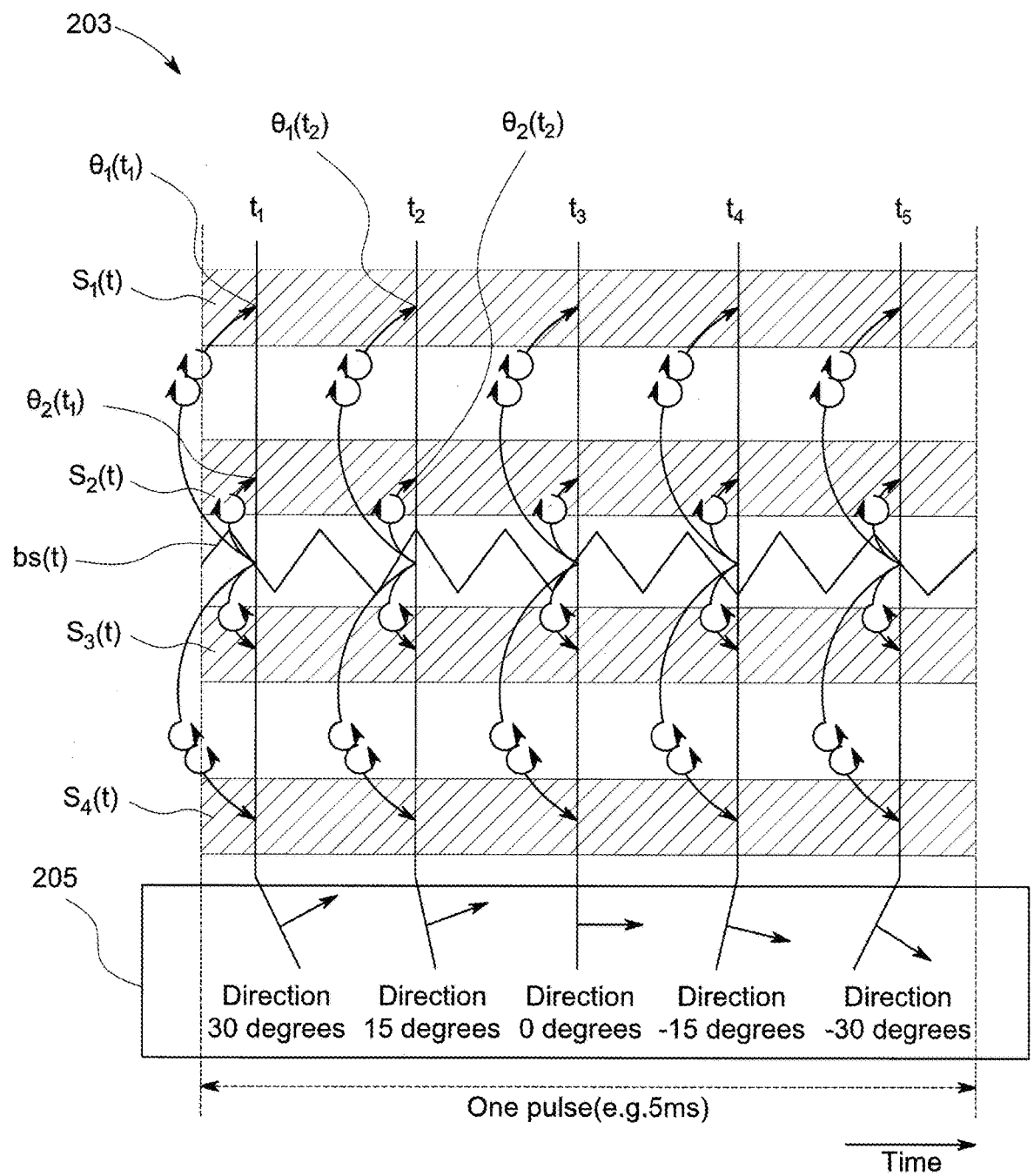
FIG. 2B illustrates a phase shift process executed by a transmission signal generation part for generating a plurality of transmission signals, in accordance with an example embodiment of the present invention.

FIG. 2B illustrates a phase shift process executed by the transmission signal generation part 203 for generating the plurality of transmission signals $s_n(t)$, in accordance with an example embodiment of the present invention. The phase shift process illustrates that the transmission signal generation part 203 generates a plurality of transmission signals $s_1(t)$, $s_2(t)$, $s_3(t)$, and $s_4(t)$ by phase shifting the phase of the base signal bs(t) by the phase shift amount $\theta_n(t)$ such that the transmission wave 105 (not shown) generated from the plurality of transmission signals $s_1(t)$, $s_2(t)$, $s_3(t)$, and $s_4(t)$ is propagated in a detection range 205 with time t. The plurality of transmission signals $s_1(t)$, $s_2(t)$, $s_3(t)$, and $s_4(t)$ may correspond to the plurality of transmission signals $s_i(t)$. Here for the purpose of the explanation, four transmission signals $s_1(t)$, $s_2(t)$, $s_3(t)$, and $s_4(t)$ are considered. However, the plurality of transmission signals $s_n(t)$ may comprise any finite number of transmission signals without deviating from the scope of the invention. The detection range 205 may include emission directions of the transmission wave 105 at different time instances $t_1$, $t_2$, $t_3$, $t_4$, and $t_5$. Here for the purpose of explanation, the detection range 205 of a range +30 degree to −30 degree is considered. However, the detection range 205 may have any range from a range of +90 degree to −90 degree without deviating from the scope of the invention. Further, the time t of duration 5 ms is considered for exemplary purpose, however the time t may not be limited to the duration of 5 ms.

In an example embodiment, the transmission signal generation part 203 generates the plurality of transmission signals $s_1(t)$, $s_2(t)$, $s_3(t)$, and $s_4(t)$ using the phase shift amount $\theta_n(t)$ that is continuously varying over the time t for each transmission signal, relative to the base signal bs(t). For instance, a first phase shift amount $\theta_1(t_1)$ of the first transmission signal $s_1(t)$ at a first time ($t_1$) is different from a second phase shift amount $\theta_1(t_2)$ of the first transmission signal $s_1(t)$ at a second time ($t_2$). The first phase shift amount $\theta_1(t_1)$ and the second phase shift amount $\theta_1(t_2)$ may be measured in relation to the phase of the base signal bs(t). Further, the first time ($t_1$) may be different from the second time ($t_2$).

In an example embodiment, the transmission signal generation part 203 generates the plurality of transmission signals $s_1(t)$, $s_2(t)$, $s_3$, and $s_4(t)$ using the phase shift amount $\theta_n(t)$ that is different for any two transmission signals $s_1(t)$, $s_2(t)$, $s_3(t)$, and $s_4(t)$ at any given time instance $t_1$, $t_2$, $t_3$, $t_4$, and $t_5$. For instance, a third phase shift amount $\theta_2(t_1)$ of the second transmission signal $s_2(t)$ at the first time ($t_1$) is different from the first phase shift amount $\theta_1(t_1)$ of the first transmission signal $s_1(t)$ at the first time ($t_1$). The third phase shift amount $\theta_2(t_1)$ of the second transmission signal $s_2(t)$ and the first phase shift amount $\theta_1(t_1)$ of the first transmission signal $s_1(t)$ may be measured with respect to the phase of the base signal bs(t). Further, the second transmission signal $s_2(t)$ may be different from the first transmission signal $s_1(t)$.

In an example embodiment, the transmission signal generation part 203 generates the plurality of transmission signals $s_1(t)$, $s_2(t)$, $s_3(t)$, and $s_4(t)$ such that a phase difference $\Delta\theta$ between any two transmission signals $s_1(t)$, $s_2(t)$, $s_3(t)$, and $s_4(t)$ is continuously varying with the time t. For instance, a first phase difference $\Delta\theta_1$ between the first transmission signal $s_1(t)$ and the second transmission signal $s_2(t)$ at the first time ($t_1$) is different from a second phase difference $\Delta\theta_2$ between the first transmission signal $s_1(t)$ and the second transmission signal $s_2(t)$ at the second time ($t_2$). The first phase difference $\Delta\theta_1$ may be mathematically represented as $\Delta\theta_1=|\theta_1(t)-\theta_2(t_1)|$. The second phase difference $\Delta\theta_2$ may be mathematically represented as $\Delta\theta_2=|\theta_1(t_2)-\theta_2(t_2)|$.

Further, the phase shift process executed by the transmission signal generation part 203 may be mathematically represented as $s_n(t)=bs(t) \cdot e^{j\theta_n(t)}$, where the notation $s_n(t)$ corresponds to the plurality of transmission signals generated by the transmission generation part 203, the notation bs(t) corresponds to the base signal generated by the base signal generation part 201, the notation $\theta_n(t)$ corresponds to the phase shift amount for generating the plurality of transmission signals $s_n(t)$ from the base signal bs(t).

The base signal bs(t) may be mathematically represented as $bs(t)=e^{j2\pi ft}$, when the base signal bs(t) corresponds to the continuous wave (CW). The base signal bs(t) may be mathematically represented as $$bs(t) = e^{j\left(2\pi f_1 t + \pi \frac{B}{T} t^2\right)},$$

when the base signal bs(t) corresponds to the Chirp signal. The notation $f_1$ may be a start frequency, the notation B may be a bandwidth, and the notation T may be a pulse length.

The phase shift amount $\theta_n(t)$ may be mathematically represented as $$\theta_n(t) = 2 \cdot \pi \cdot f(t) \cdot \frac{d_n(t)}{c},$$

where the notation n may be a transmission element number of the transmission element 103a (e.g. n=1, 2, 3, ..., N), the notation f(t) may be an instant frequency of the base signal bs(t) at every time point t, the notation c is a constant and denotes speed of sound in the water (e.g. c=1500 m/s), the notation $d_n(t)$ may be a delay distance of each transmission element 103a. The delay distance $d_n(t)$ may be determined from a configuration of the transmission array 103. The configuration of the transmission array 103 is further explained in the detailed description of FIG. 2C.

Figure 2C:
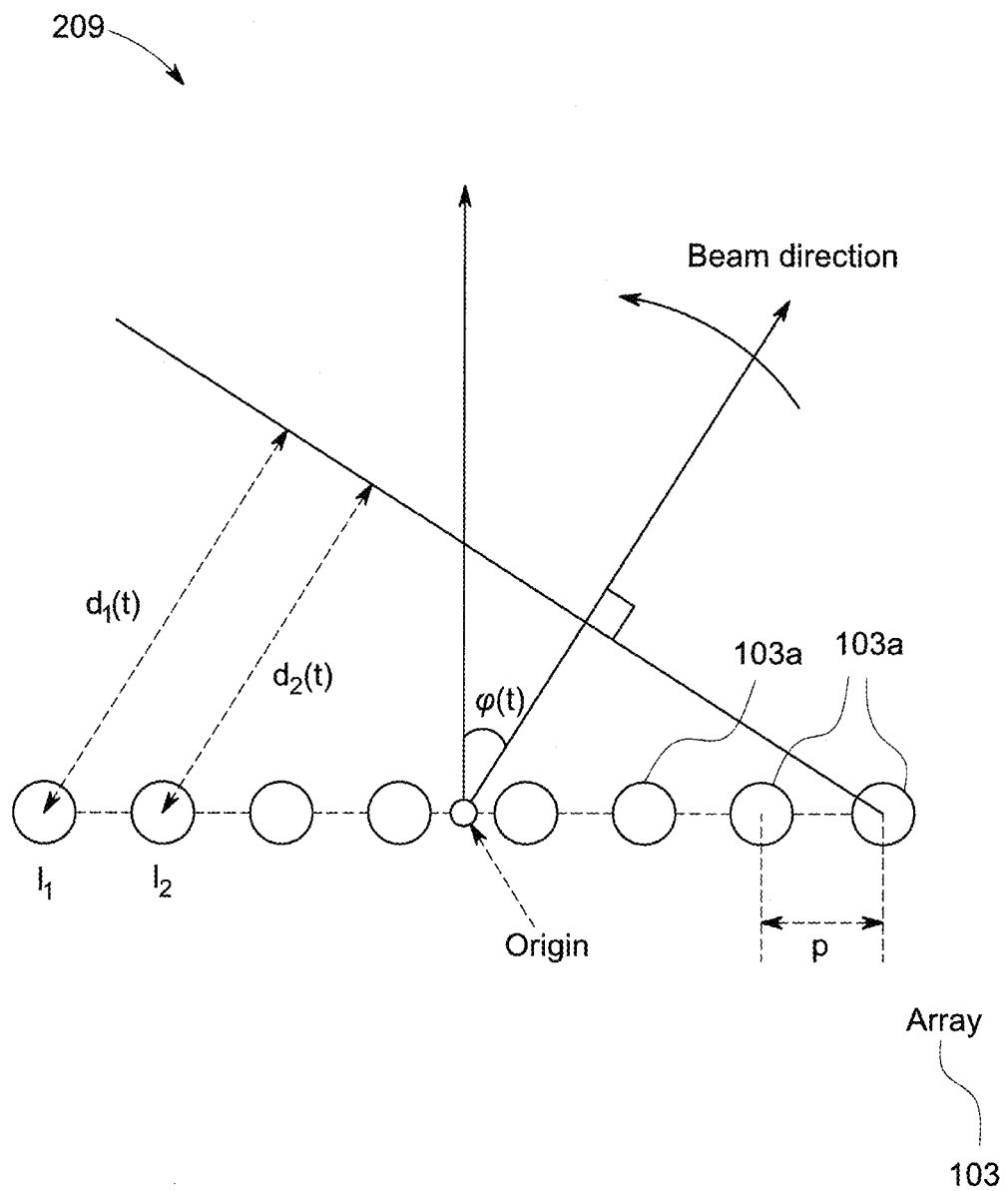
FIG. 2C illustrates a schematic diagram of configuration of a transmission array, in accordance with an example embodiment of the present invention.

FIG. 2C illustrates a schematic diagram of a configuration 209 of the transmission array 103, in accordance with an example embodiment of the present invention. The configuration 209 illustrates that the plurality of transmission elements 103a are located at coordinates $l_n$ and further illustrates that any two consecutive transmission elements 103a in the transmission array 103 are separated by a pitch p. In an example embodiment, the pitch p between any two consecutive transmission elements 103a may be constant. To that end, the transmission wave 105 may be smoothly transmitted in a desired emission direction. The delay distance $d_n(t)$ may be mathematically represented from the configuration 209 as $d_n(t)=l_n \cdot \sin(\varphi(t))$, where the notation $l_n$ may be the coordinates of the plurality of transmission elements 103a and the notation $\varphi(t)$ may be the emission direction (e.g., the detection range 205) at every time point t. The notation $l_n$ may be mathematically represented as $$l_n = p \cdot n - \frac{p \cdot (N+1)}{2},$$

where the notation p may be the pitch between any two consecutive transmission elements 103a.

Referring to FIG. 2A, in an example embodiment, the transmission signal generation part 203 calculates the phase shift amount $\theta_n(t)$ at every time point for each transmission signal $s_n(t)$ by selecting the emission direction $\varphi(t)$ (e.g., an emission direction in the detection range 205) at every time point t. The transmission signal generation part 203 generates the plurality of transmission signals $s_n(t)$ by phase shifting the phase of the base signal bs(t) by the calculated phase amount $\theta_n(t)$. Further, the transmission signal generation part 203 inputs each of the generated plurality of transmission signals $s_n(t)$ into one of the transmission elements 103a. Accordingly, the emission direction $\varphi(t)$ of the transmission wave 105 transmitted by the transmission array 103 changes with time tin response to change in the phase shift amount $\theta_n(t)$ with time t. In other words, the transmission wave 105 generated from the generated plurality of transmission signals $s_n(t)$ may be the beams of different emission directions $\varphi(t)$, which are varying with time t in response to change in the phase shift amount $\theta_n(t)$ with time t. The change in the phase shift amount $\theta_n(t)$ with time t for each of the plurality of transmission signals $s_n(t)$ is further graphically explained in the detailed description of FIGS. 3A-3B.

Figure 3A:
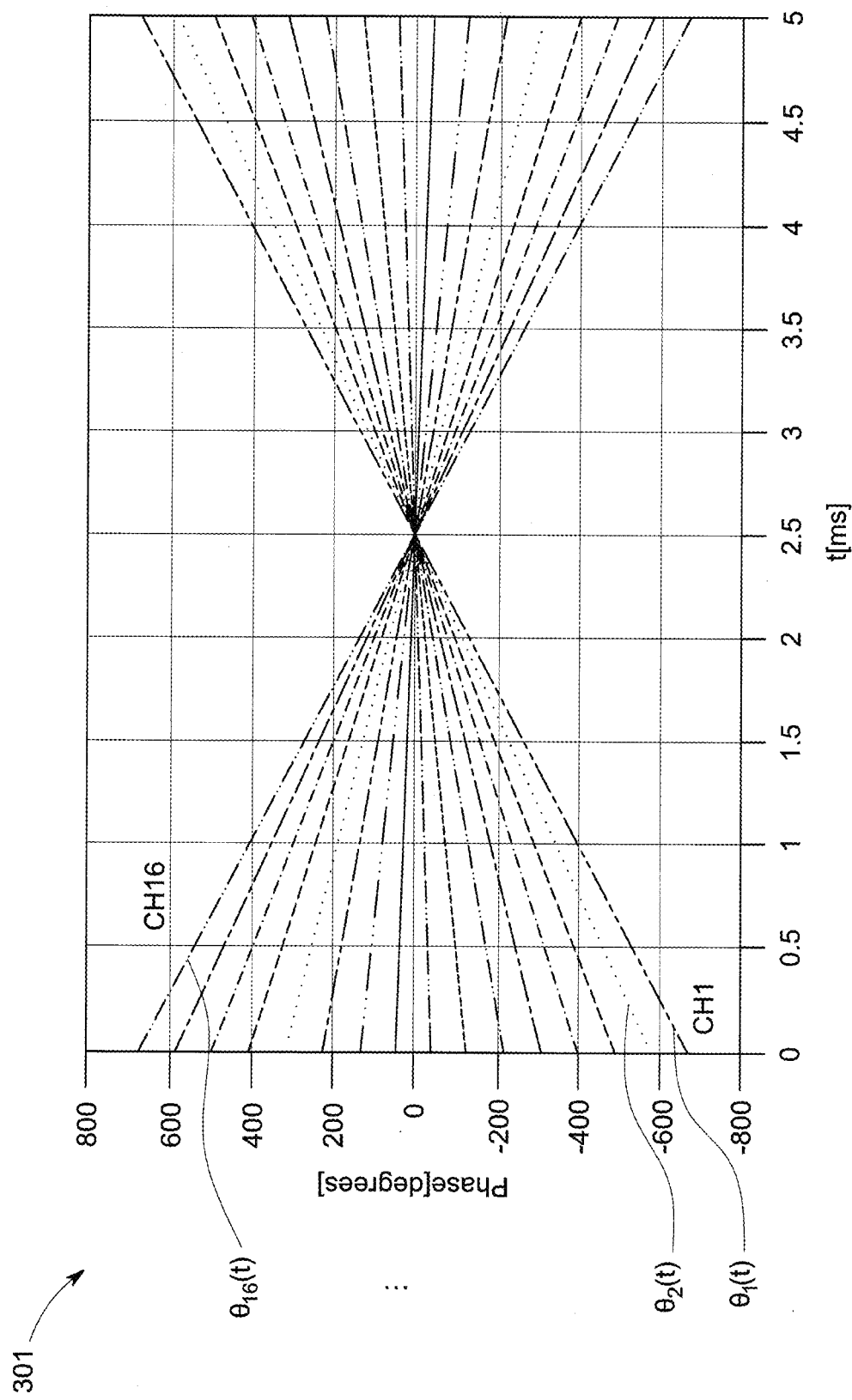
FIG. 3A illustrates a graph showing a change in a phase shift amount with time for each of the plurality of transmission signals when a base signal is a continuous wave, in accordance with an example embodiment of the present invention.

FIG. 3A illustrates a graph 301 showing the change in the phase shift amount $\theta_n(t)$ with time t for each of the plurality of transmission signals $s_n(t)$, when the base signal bs(t) is the continuous wave, in accordance with an example embodiment of the present invention. For instance, the graph 301 illustrates the change in the phase shift amount $\theta_n(t)$ for parameters N=16, f(t)=150 kHz, p=5 mm, $\varphi(t)$=−30 to 30 degree, t=0 ms to 5 ms. The notation N may be a total number of transmission elements in the transmission array 103. As N=16, the transmission signal generation part 203 may generate sixteen transmission signals $s_n(t)$ (e.g., channel-1 (CH1) to channel-16 (CH16)). Here for the purpose of explanation, the graph 301 illustrates the change in the phase shift $\theta_n(t)$ for sixteen transmission signals $s_n(t)$. However, the plurality of transmission signals may be any finite number of transmission signals without deviating from the scope of the invention.

As illustrated in the graph 301, x-axis of the graph 301 may be time t and y-axis of the graph 301 may be the phase shift amount $\theta_n(t)$ for the plurality of transmission signals $s_n(t)$. The graph 301 illustrates that the phase shift amount $\theta_n(t)$ (e.g. $\theta_1(t)$ to $\theta_{16}(t)$) corresponding to the plurality of transmission signals $s_n(t)$ (e.g. CH1 to CH16) respectively is continuously varying with time t. The graph 301 further illustrates that the phase shift amount $\theta_n(t)$ corresponding to any two transmission signals of the plurality of transmission signals $s_n(t)$ is different at a given time t. Furthermore, the graph 301 illustrates that the phase difference $\Delta\theta$ between any two transmission signals of the plurality of transmission signals $s_n(t)$ is continuously varying with the time t.

Figure 3B:
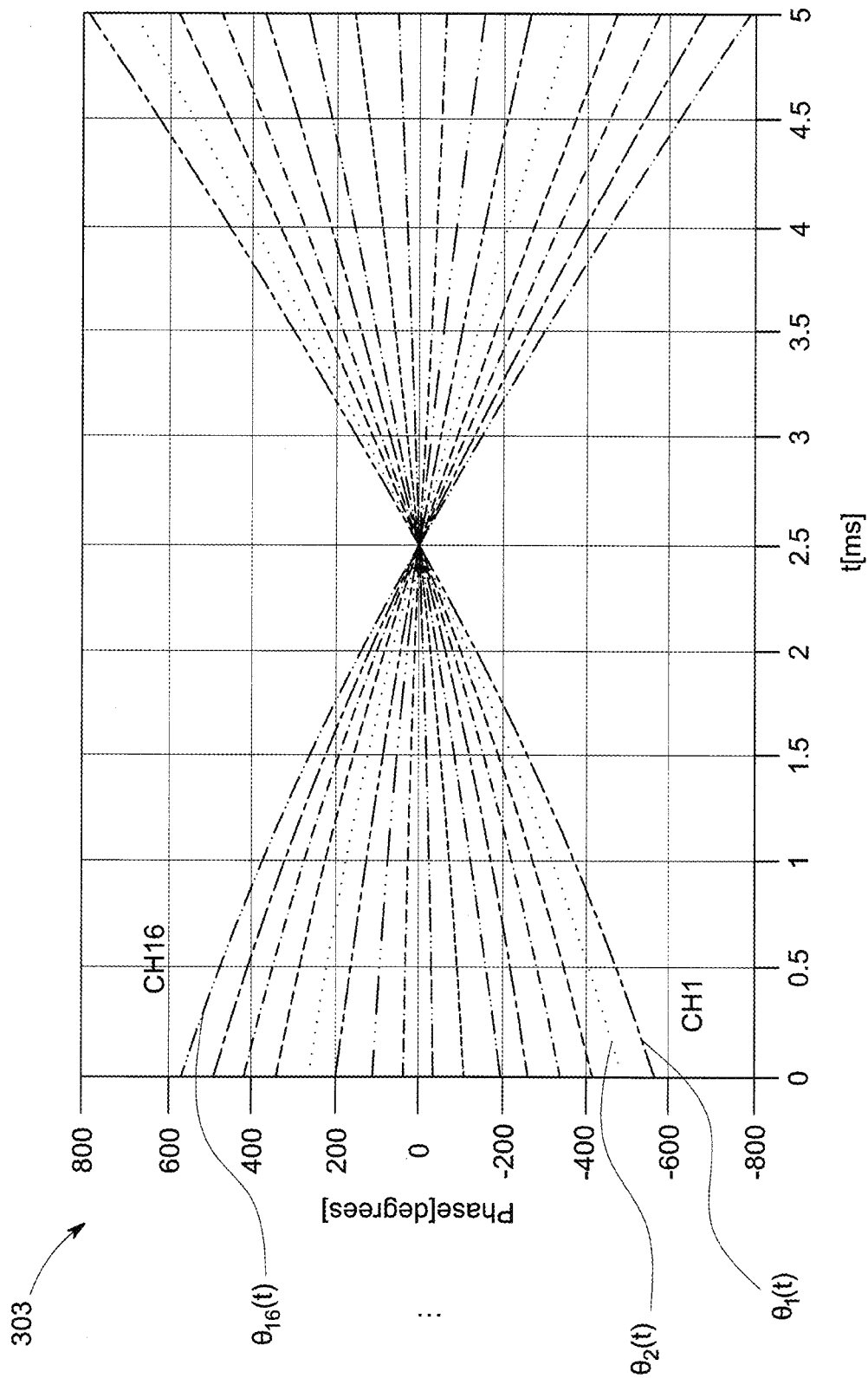
FIG. 3B illustrates a graph showing the change in the phase shift amount with time for each of the plurality of transmission signals when the base signal is a linear FM wave, in accordance with an example embodiment of the present invention.

FIG. 3B illustrates a graph 303 showing the change in the phase shift amount $\theta_n(t)$ with time t for each of the plurality of transmission signal $s_n(t)$, when the base signal bs(t) is the linear FM wave, in accordance with an example embodiment of the present invention. For instance, the graph 303 illustrates the change in the phase shift amount $\theta_n(t)$ for parameters N=16, f(t)=125 kHz to 175 kHz, p=5 mm, $\varphi(t)$=−30 to 30 degree, t=0 ms to 5 ms. The notation N may be the total number of transmission elements in the transmission array 103. As N=16, the transmission signal generation part 203 may generate sixteen transmission signals $s_n(t)$ (e.g., channel-1 (CH1) to channel-16 (CH16)).

As illustrated in the graph 303, x-axis of the graph 303 may be time t and y-axis of the graph 303 may be the phase shift amount $\theta_n(t)$ for the plurality of transmission signals $s_n(t)$. The graph 303 illustrates that the phase shift amount $\theta_n(t)$ (e.g. $\theta_1(t)$ to $\theta_{16}(t)$ corresponding to the plurality of transmission signals $s_n(t)$ (e.g. CH1 to CH16) is continuously varying with the time t. The graph 303 further illustrates that the phase shift amount $\theta_n(t)$ corresponding to any two transmission signals is different at a given time t. Furthermore, the graph 303 illustrates that the phase difference $\Delta\theta$ between any two transmission signals is continuously varying with the time t. Further, a change in the instant frequency f(t) with respect to time t for each of the plurality of signals $s_n(t)$ is as illustrated in the detailed description of FIGS. 4A-4B.

Figure 4A:
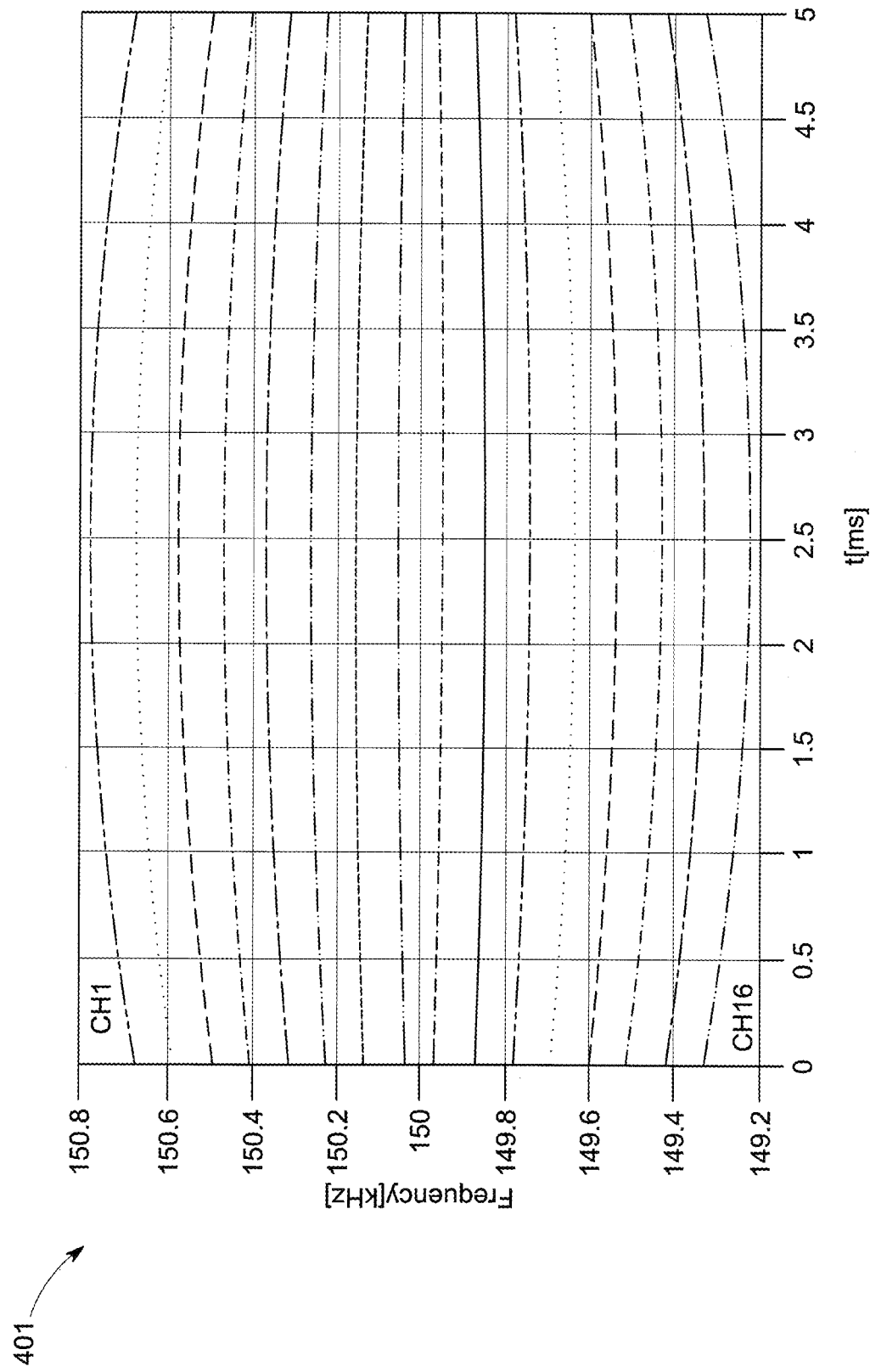
FIG. 4A illustrates a graph showing a change in an instant frequency with time for each of the plurality of transmission signals when the base signal is the continuous wave, in accordance with an example embodiment of the present invention.

FIG. 4A illustrates a graph 401 showing the change in the instant frequency f(t) with time for each of the plurality of transmission signals $s_n(t)$, when the base signal bs(t) is the continuous wave, in accordance with an example embodiment of the present invention. For instance, the graph 401 illustrates the change in the instant frequency f(t) for the plurality of transmission signals $s_n(t)$ when the base signal bs(t) corresponds to the continuous wave of a constant frequency of 150 kHz.

As illustrated in the graph 401, x-axis of the graph 401 may be time t and y-axis of the graph 401 may be the instant frequency f(t) for the plurality of transmission signals $s_n(t)$. The graph 401 illustrates that the instant frequency f(t) of each of the plurality of transmission signals $s_n(t)$ (e.g., CH1 to CH16) is almost constant with time t, as the base signal bs(t) is the continuous wave of the constant frequency of 150 kHz.

Figure 4B:
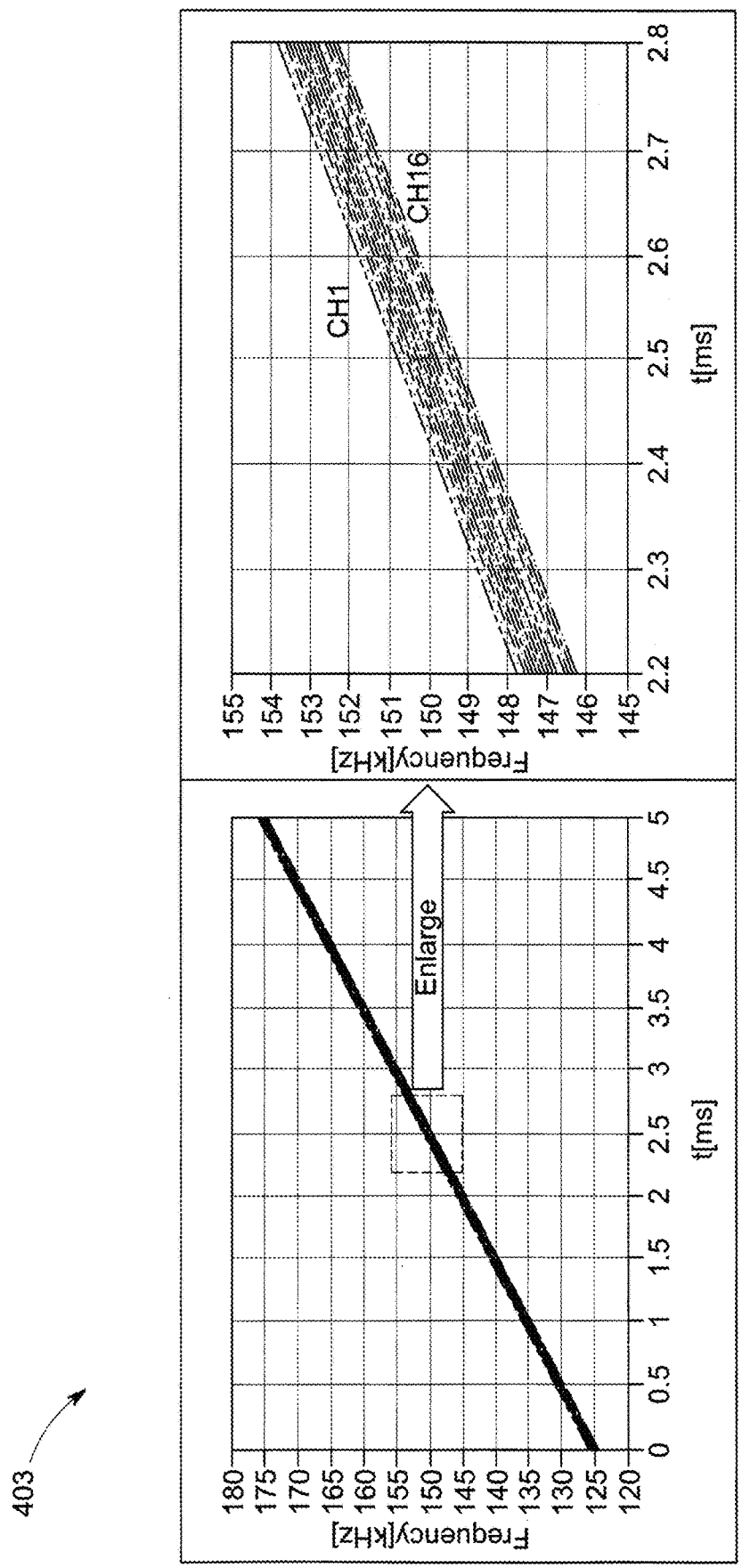
FIG. 4B illustrates a graph showing the change in the instant frequency with time for each of the plurality of transmission signals when the base signal is the linear FM wave, in accordance with an example embodiment of the present invention.

FIG. 4B illustrates a graph 403 showing the change in the instant frequency f(t) with time for each of the plurality of transmission signals $s_n(t)$, when the base signal bs(t) is the linear FM wave, in accordance with an example embodiment of the present invention. For instance, the graph 403 illustrates the change in the instant frequency f(t) for the plurality of transmission signals $s_n(t)$ when the base signal bs(t) corresponds to the linear FM wave whose frequency is linearly varying from 125 kHz to 175 kHz. In an example embodiment, the frequency range of the base signal bs(t) may be selected in regard to a frequency range characteristic of transmission array 103. To that end, the target detection device 100 avoids research & development cost on the transmission array 103. As illustrated in the graph 403, x-axis of the graph 403 may be time t and y-axis of the graph 403 may be the instant frequency f(t) for the plurality of transmission signals $s_n(t)$. The graph 403 illustrates that the instant frequency f(t) of each the plurality of signals $s_n(t)$ (e.g., CH1 to CH16) is linearly varying with time t at the frequency range of 125 kHz to 175 kHz, as the base signal bs(t) is linear FM wave of the frequency range 125 kHz to 175 kHz. The transmission wave 105 transmitted from the transmission array 103 using the plurality of transmission signals $s_n(t)$ (e.g., CH1 to CH16) is further explained in the detailed description of FIG. 5.

Figure 5:
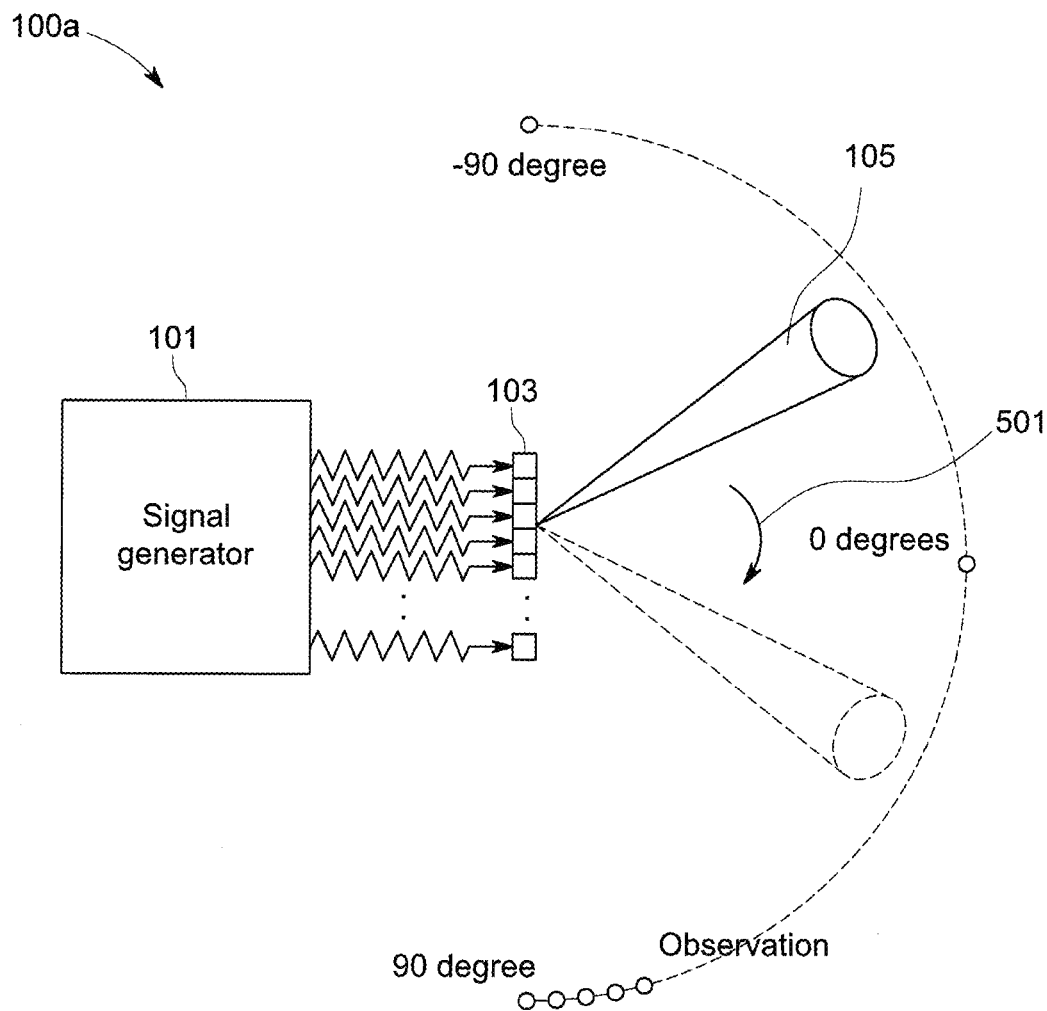
FIG. 5 illustrates an exemplary scenario showing the transmission part for transmitting the transmission wave, in accordance with an example embodiment of the present invention.

FIG. 5 illustrates an exemplary scenario showing the transmission part 100a for transmitting the transmission wave 105, in accordance with an example embodiment of the present invention. The transmission part 100a includes the signal generator 101 and the transmission array 103 for transmitting the transmission wave 105. The signal generator 101 may generate the plurality of transmission signals $s_n(t)$ as explained in the detailed description of FIGS. 2A-2C. For instance, the signal generator 101 may generate each of the plurality of transmission signals $s_n(t)$ from the base signal bs(t) by phase shifting the phase of the base signal bs(t) by the phase shift amount $\theta_n(t)$. Further, the signal generator 101 may input each of the plurality of transmission signals $s_n(t)$ into one of the transmission elements 103a (not shown) of the transmission array 103. The transmission array 103 may convert the plurality of transmission signals $s_n(t)$ into the transmission wave 105 as illustrated in FIG. 5. The transmission wave 105 may be the beam whose emission direction is changing in a direction 501 (e.g., in the vertical direction) with the time t in response to the change in the phase shift amount $\theta_n(t)$ with time t. For instance, the transmission wave 105 may be the beam that starts at an emission direction −30 degree and ends at an emission direction +30 degree with varying time t. The change in the emission direction $\varphi(t)$ of the transmission wave 105 with time t is further graphically illustrated in FIGS. 6A-6B.

Figure 6A:
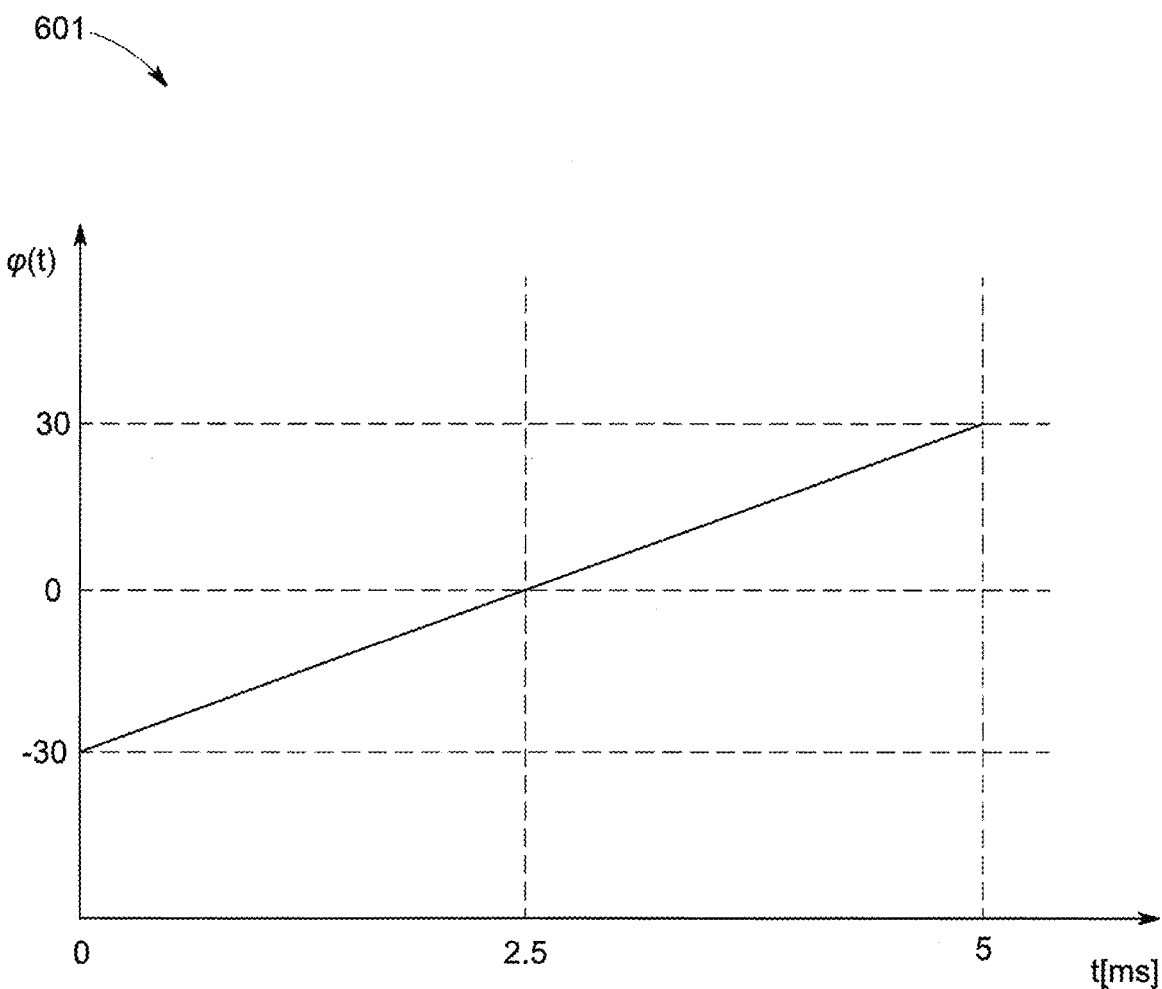
FIG. 6A illustrates a graph showing a change in an emission direction of the transmission wave with time, in accordance with an example embodiment of the present invention.

FIG. 6A illustrates a graph 601 showing the change in the emission direction of the transmission wave 105 with time t, in accordance with an example embodiment of the present invention. As illustrated in the graph 601, x-axis of the graph 601 may be time t and y-axis of the graph 601 may be the emission direction φ(t). The graph 601 illustrates that the emission direction φ(t) of the transmission wave 105 is linearly changing with time t. For instance, the emission direction φ(t) of the transmission wave 105 changes linearly with time t, according to a linear function. In some other example embodiments, the emission direction φ(t) of the transmission wave 105 may vary non-linearly with time t. For instance, the emission direction φ(t) may non-linearly vary with time t, as illustrated in FIG. 6B.

Figure 6B:
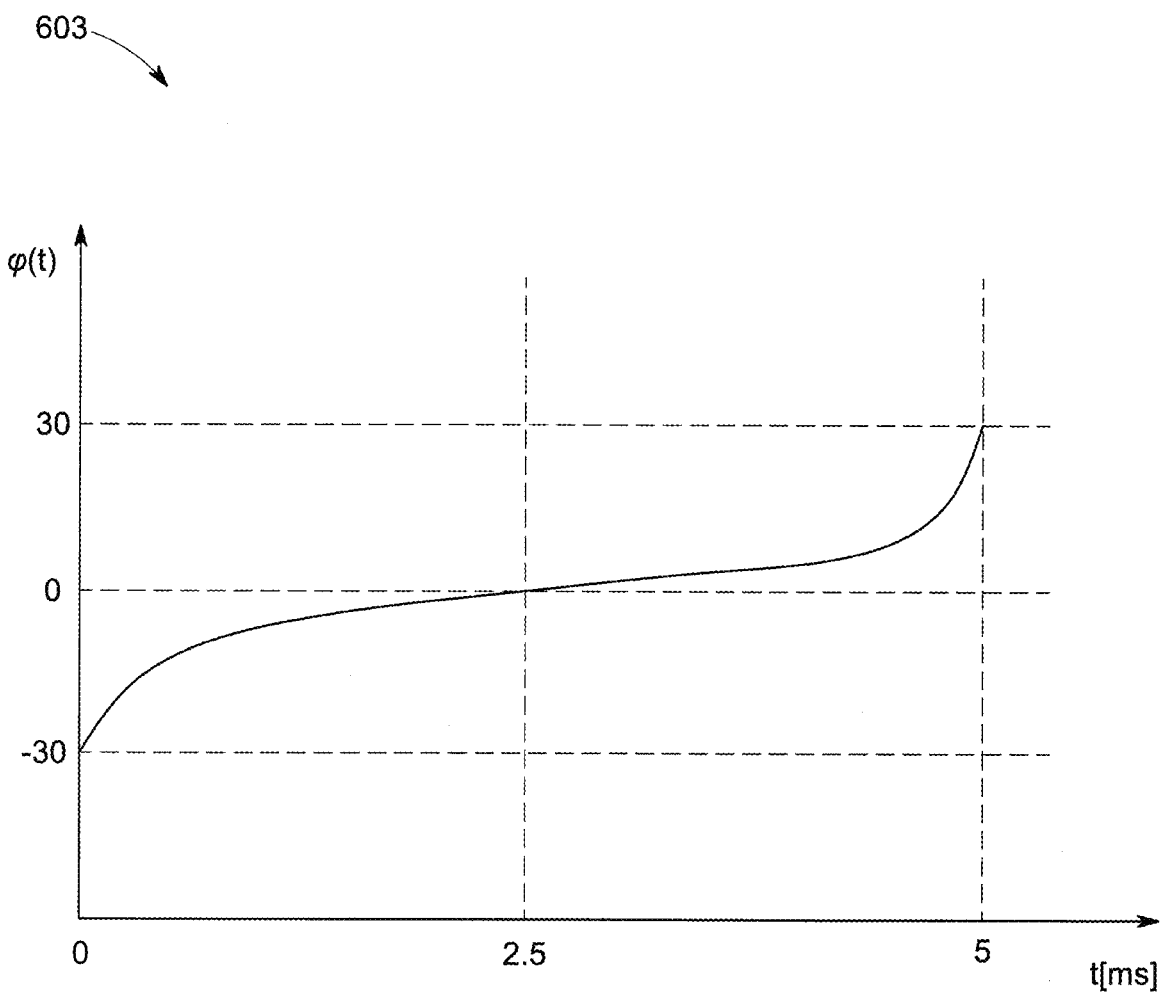
FIG. 6B illustrates a graph showing a change in an emission direction of the transmission wave with time, in accordance with another example embodiment of the present invention.

FIG. 6B illustrates a graph 603 showing the change in the emission direction of the transmission wave 105 with time t, in accordance with another example embodiment of the present invention. As illustrated in the graph 603, x-axis of the graph 603 may be time t and y-axis of the graph 603 may be the emission direction φ(t). The graph 603 illustrates that the emission direction φ(t) of the transmission wave 105 is non-linearly changing with time t. For instance, the emission direction φ(t) of the transmission wave 105 changes non-linearly with time t, according to an arcsin function (e.g. an inverse of a sine function). Therefore, the emission direction φ(t) of the transmission wave 105 may change either linearly or non-linearly with time t irrespective of whether the base signal bs(t) is the continuous wave or the linear FM wave. Further, the change in the emission direction φ(t) with respect to time t when the base signal bs(t) is the continuous wave is further graphically illustrated in FIG. 7.

Figure 7:
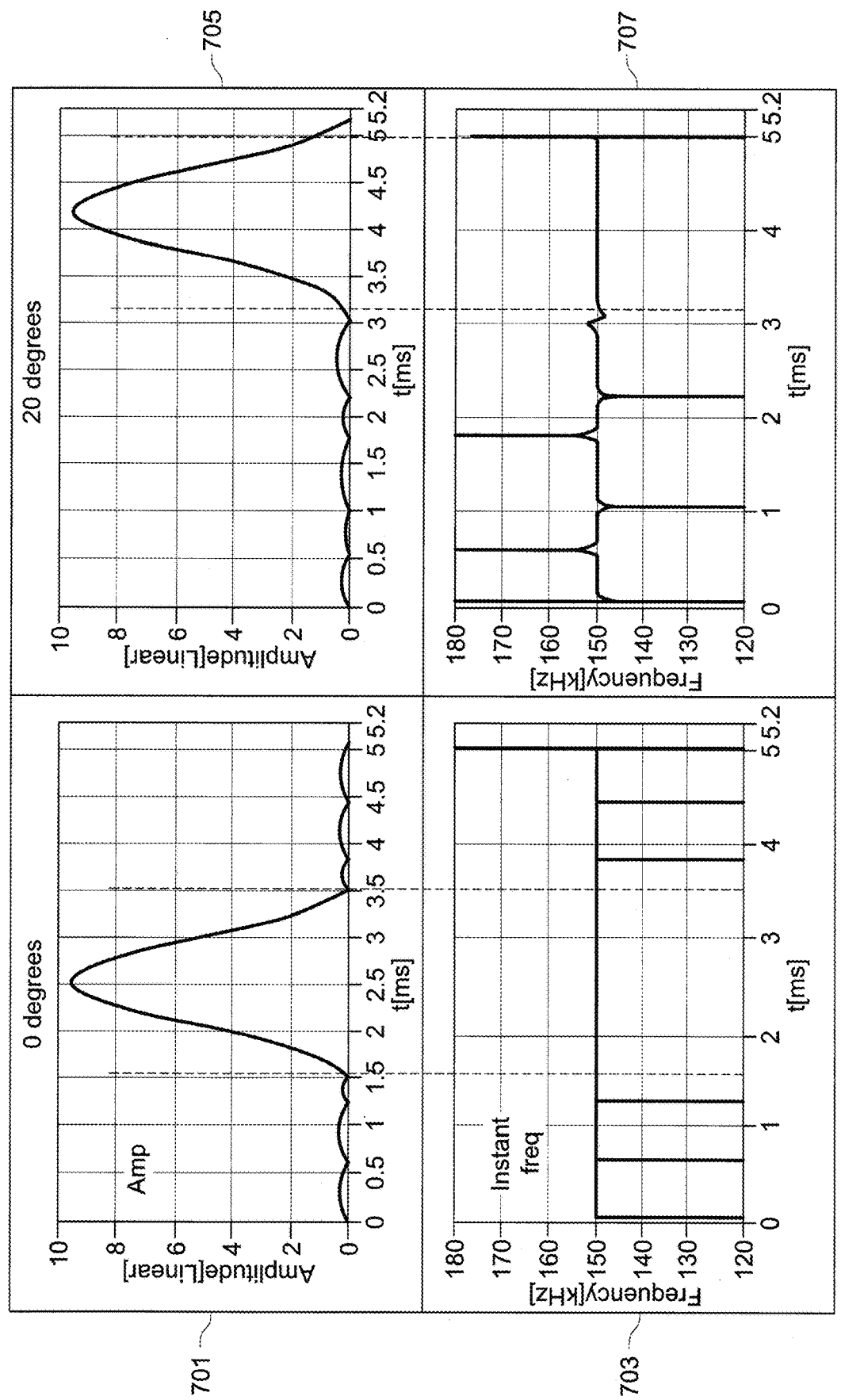
FIG. 7 illustrates graphs showing the change in the emission direction with respect to time when the base signal is the continuous wave, in accordance with an example embodiment of the present invention.

FIG. 7 illustrates graphs 701, 703, 705, and 707 showing the change in the emission direction φ(t) with respect to time t when the base signal bs(t) is the continuous wave, in accordance with an example embodiment of the present invention. As illustrated in the graphs 701 and 705, x-axis of the graphs 701 and 705 may be time t and y-axis of the graphs 701 and 705 may be amplitude of the transmission wave 105. As illustrated in the graphs 703 and 707, x-axis of the graphs 703 and 707 may be time t and y-axis may be the instant frequency f(t). The graph 701 and the graph 703 illustrate the amplitude and the instant frequency f(t) of the transmission wave 105 respectively, when the transmission wave 105 is at the emission direction φ(t)=0 degree. The graph 705 and the graph 707 illustrate the amplitude and the instant frequency f(t) of the transmission wave 105 respectively, when the transmission wave 105 is at the emission direction q(t)=20 degree. The graphs 701 and 705 illustrate that the emission direction of the transmission wave 105 changes with the time t. For instance, a peak amplitude of the transmission wave 105 of two different emission directions is appearing at two different time instances. The graphs 703 and 707 illustrate that the instant frequency (t) is constant for two different emission directions of the transmission wave 105. For instance, the instant frequency f(t) is constant for two different emission directions of the transmission wave 105, as the base signal bs(t) is the continuous wave of the constant frequency. Further, the change in the emission direction φ(t) with respect to time t when the base signal bs(t) is the linear FM wave is further graphically illustrated in FIG. 8.

Figure 8:
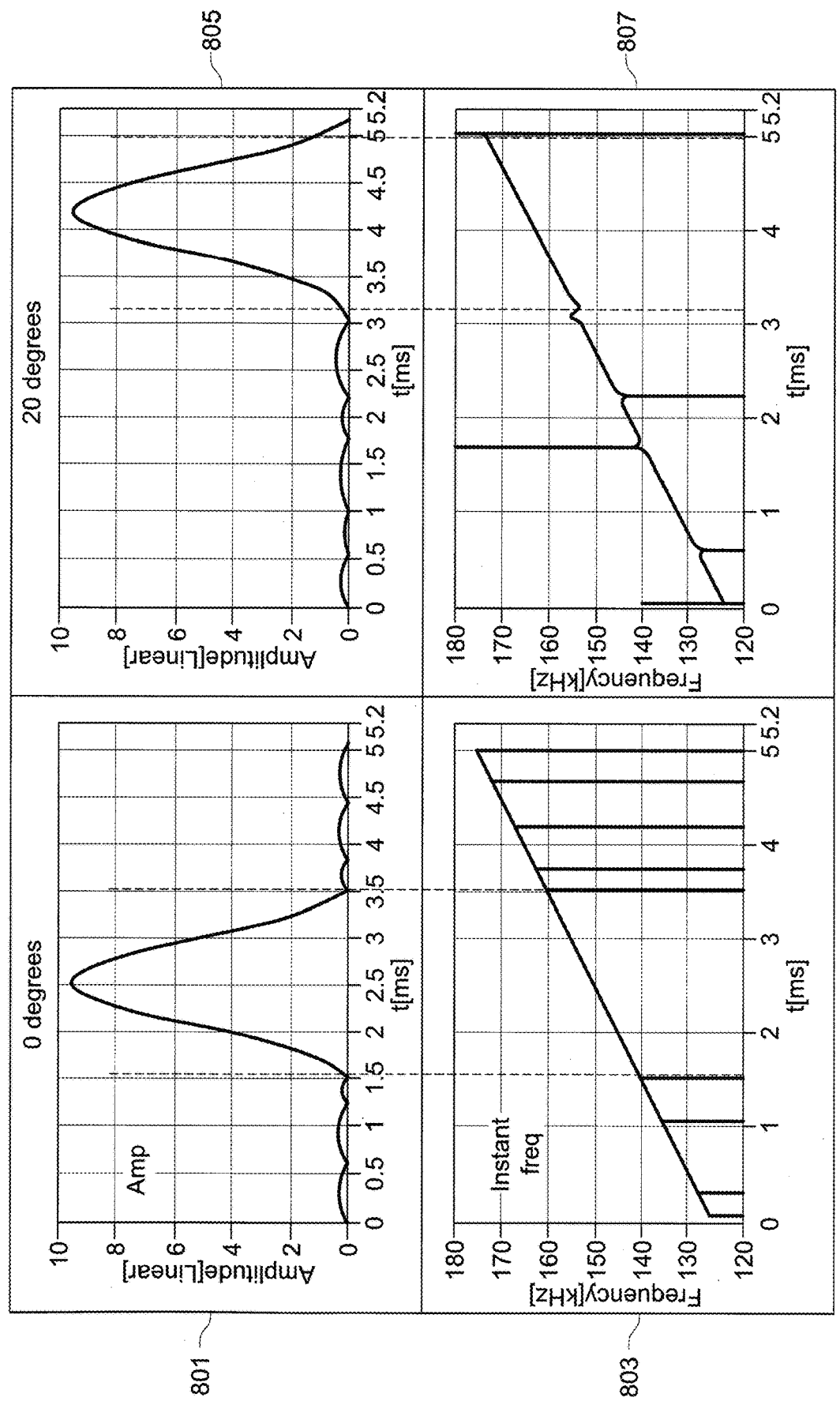
FIG. 8 illustrates graphs showing the change in the emission direction with respect to time when the base signal is the linear FM wave, in accordance to an example embodiment of the present invention.

FIG. 8 illustrates graphs 801, 803, 805, and 807 showing the change in the emission direction φ(t) with respect to time t when the base signal bs(t) is the linear FM wave, in accordance with an example embodiment of the present invention. According to some embodiments, when the base signal bs(t) corresponds to the FM wave, the emission direction φ(t) of the transmission wave 105 changes with respect to time t and the instant frequency f(t) of the transmission wave 105 also changes with respect to time t. As a result, the instant frequency f(t) of the transmission wave 105 changes with the emission direction φ(t) of the transmission wave 105.

As illustrated in the graphs 801 and 805, x-axis of the graphs 801 and 805 may be the time t and y-axis of the graphs 801 and 805 may be the amplitude of the transmission wave 105. As illustrated in the graphs 803 and 807, x-axis of the graphs 803 and 807 may be the time t and y-axis of the graphs 803 and 807 may be the instant frequency f(t). The graph 801 and the graph 803 illustrate the amplitude and the instant frequency f(t) of the transmission wave 105 respectively, when the transmission wave 105 is at the emission direction φ(t)=0 degree. The graph 805 and the graph 807 illustrate the amplitude and the instant frequency f(t) of the transmission wave 105 respectively, when the transmission wave 105 is at the emission direction φ(t)=20 degree. The graphs 801, 803, 805, and 807 illustrate that the emission direction φ(t) of the transmission wave 105 changes with respect to time t and the instant frequency f(t) of the transmission wave 105 changes with the emission direction φ(t). Therefore, each emission direction corresponds to a given frequency, and a unique direction-frequency relationship is thus established. For instance, a peak amplitude of the transmission wave 105 of different emission directions is appearing at different time instances and at different instant frequencies. The transmission wave 105 of different emission directions at different frequencies and at different time instances transmitted by the transmission array 103 is as illustrated in FIG. 9A.

Figure 9A:
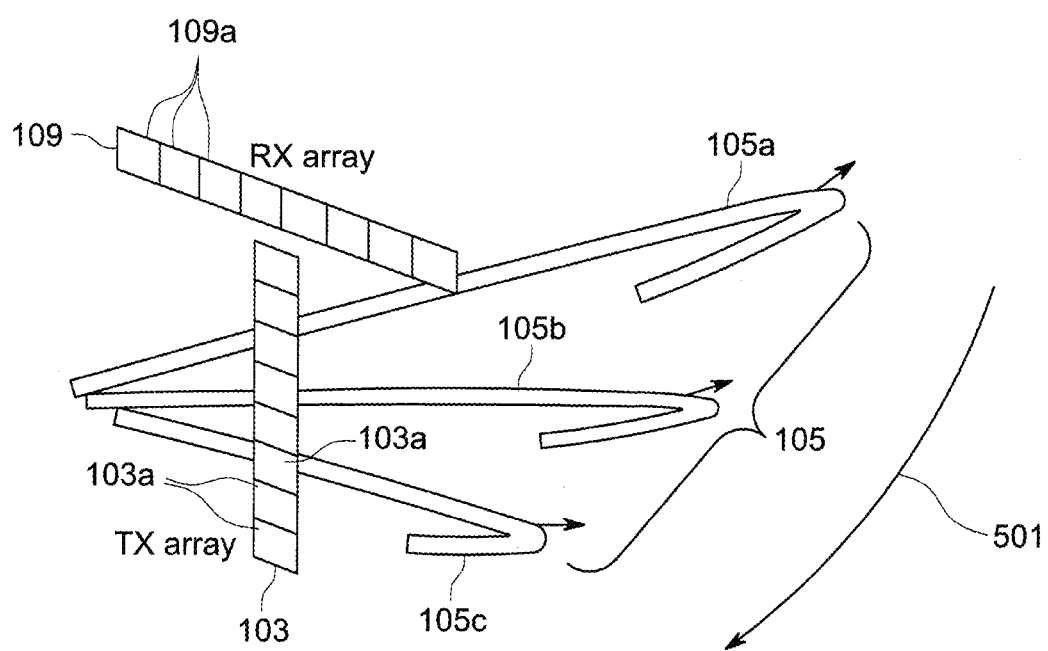
FIG. 9A illustrates a diagram showing the transmission wave transmitted by the transmission array, in accordance with an example embodiment of the present invention.

FIG. 9A illustrates a diagram showing the transmission wave 105 transmitted by the transmission array 103, in accordance with an example embodiment of the present invention. The transmission array 103 having the plurality of the transmission elements 103a may transmit the transmission wave 105 in response to the signal generator 101 generating the plurality of transmission signals $s_n(t)$ as explained in the detailed description of FIGS. 2A-2C. The transmission wave 105 may be represented as beams 105a, 105b, 105c as depicted in FIG. 9A. In an embodiment, each of the beams 105a, 105b, and 105c of different emission direction φ(t) may be transmitted at different time t and at different instant frequency f(t), when the base signal bs(t) is the FM wave. For instance, the transmission wave 105 may be the beam 105a of the emission direction φ($t_1$) transmitted at an instant frequency f($t_1$) and at the first time $t_1$. Further, when the time t changes from the first time $t_1$ to the second time $t_2$, the transmission wave 105 may change its instant frequency (e.g., from f($t_1$) to f($t_2$)) and change its emission direction (e.g., from φ($t_1$) to φ($t_2$)) in the direction 501, which may be represented by the beam 105b. Similarly, when the time t changes from the second time $t_2$ to a third time $t_3$, the transmission wave 105 may be represented by the beam 105c. To that end, the target detection device 100 may control the transmission wave 105 to propagate in the detection range using the phase shift amount $θ_n(t)$ applied to the base signal bs(t) and the instant frequency f(t) of the base signal. Therefore, the target detection device 100 may control the transmission wave 105 to propagate in the detection range with a frequency band that is similar to the frequency range (e.g., 50 kHz (125 kHz-175 kHz)) of the base signal bs(t). Accordingly, the target detection device 100 uses a narrow frequency band to control the transmission wave 105 in the detection range, in comparison to currently available technologies.

In an alternate embodiment, each of the beams 105a, 105b, and 105c of different emission directions φ(t) may be transmitted at different time instances and with the constant frequency, when the base signal bs(t) is the continuous wave. To that end, the target detection device 100 may control the transmission wave 105 with only the phase shift amount θ$_n$(t) applied to the base signal bs(t) for propagating the transmission wave 105 in the detection range. In this case, the target detection device 100 may control the transmission wave 105 to propagate in the detection range with a frequency band of zero kHz (0 kHz), as the base signal bs(t) is the continuous wave of the constant wave.

Therefore, the transmission wave 105 transmitted by the transmission array 103 may be propagated in an angle range (i.e., the detection range) selected from the range +90 degree to −90 degree in a single transmission by phase shifting the phase of the base signal bs(t) by the phase shift amount θ$_n$(t). Further, the target detection device 100 may include the reception array 109 having the plurality of reception elements 109a for receiving the reception wave 107. The reception wave 107 may be the wave (also referred to as echoes) reflected from the at least one target in response to transmitting the transmission wave 105. The transmission array 103 and the reception array 109 may be arranged in different directions. In an example embodiment, the transmission array 103 and the reception array 109 may be arranged perpendicular to each other as depicted in FIG. 9A. For instance, a direction of arrangement of the plurality of transmission elements 103a and a direction of arrangement of the plurality of reception elements 109a may be perpendicular. In an alternate embodiment, the transmission array 103 and the reception array 109 may be arranged in parallel, or at some other angle. Further, a parallel arrangement of the transmission array 103 and the reception array 109 is as depicted in the FIG. 9B.

Figure 9B:
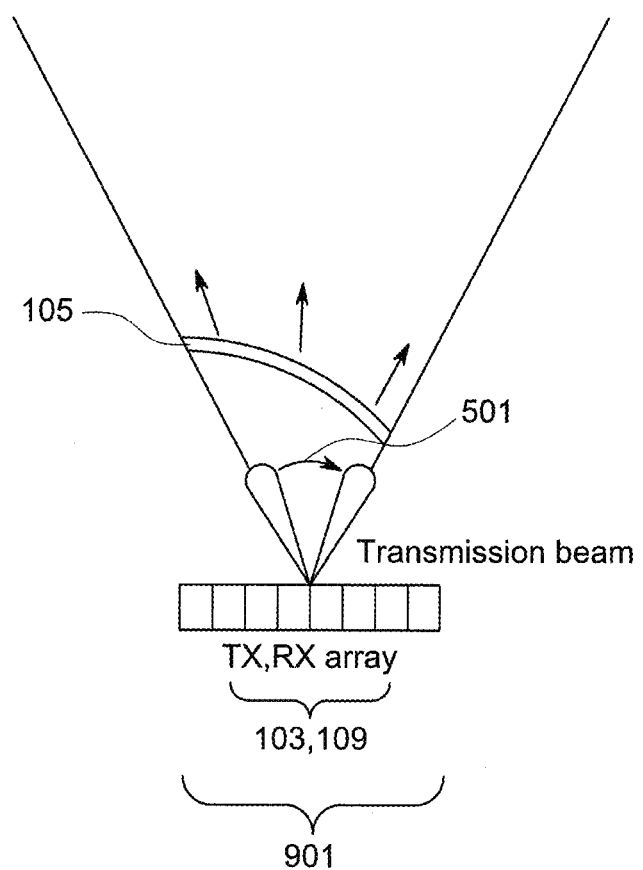
FIG. 9B illustrates a parallel arrangement of the transmission array and a reception array, in accordance with an example embodiment of the present invention.
Figure 10A:
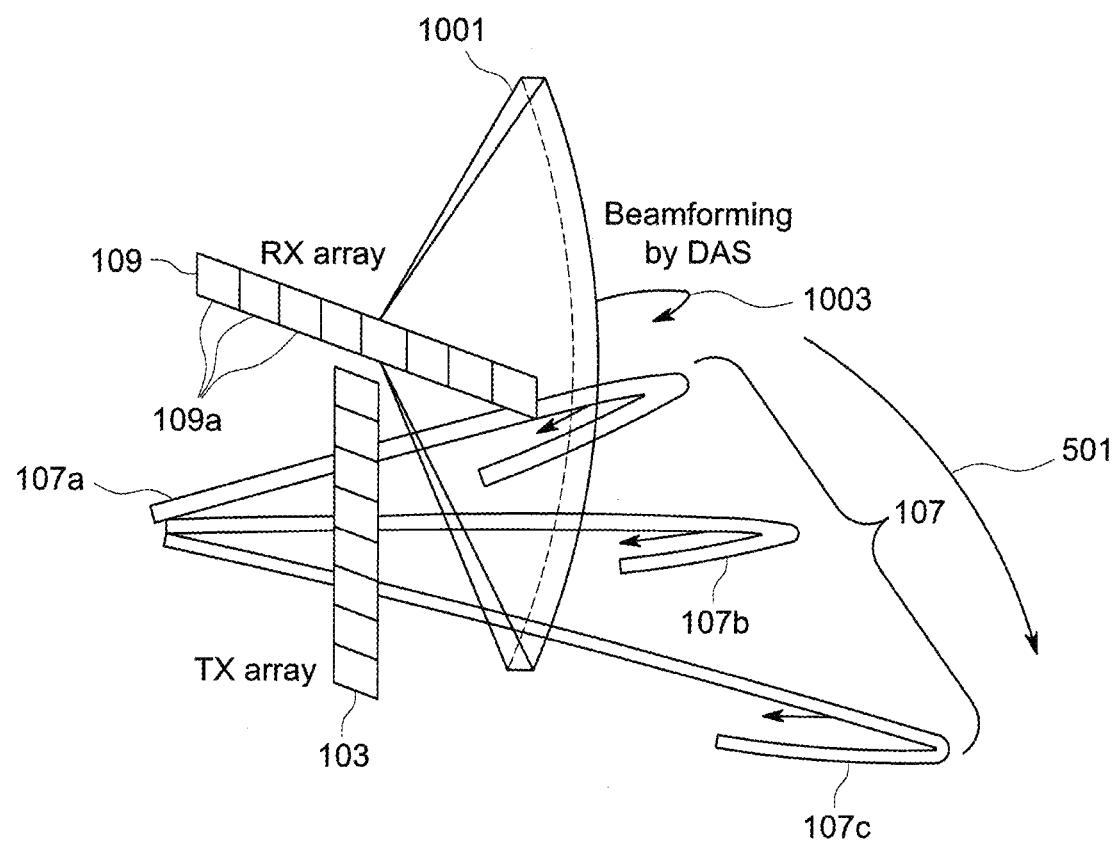
FIG. 10A illustrates a reception process for receiving a reception wave corresponding to the transmission wave when the transmission array and the reception array are perpendicularly arranged, in accordance with an example embodiment of the present invention.

FIG. 9B illustrates a parallel arrangement of the transmission array 103 and the reception array 109, in accordance with an example embodiment of the present invention. As illustrated in FIG. 9B, the transmission array 103 and the reception array 109 may be arranged in same direction. For instance, the direction of arrangement of the plurality of transmission elements 103a and the direction of arrangement of the plurality of reception elements 109a may be similar. The transmission array 103 may transmit the transmission wave 105 that is gradually changing its emission direction φ(t) in the direction 501 as explained in the detailed description of FIG. 9A. In some embodiments, the transmission array 103 having the plurality of transmission elements 103a may be replaced by a single transceiver array 901 having a plurality of transceiver elements to obtain the parallel arrangement of the transmission array 103 and the reception array 109. To that end, the single transceiver array 901 may be configured to transmit the transmission wave 105 and receive the reception 107 corresponding to the transmission wave 105. Further, a reception process for receiving the reception wave 107 corresponding to the transmission wave 105 is as explained in the detailed description of FIGS. 10A-10B. p FIG. 10A illustrates the reception process for receiving the reception wave 107 corresponding to the transmission wave when the transmission array 103 and the reception array 109 are perpendicularly arranged, in accordance with an example embodiment of the present invention. The reception wave 107 is the wave that is reflected from at least one target, in response to transmitting the transmission wave 105. As illustrated in FIG. 10A, the reception wave 107 corresponding to the transmission wave 105 may approach the reception array 109. To that end, the reception array 109 having the plurality of reception elements 109a may receive the reception wave 107. Further, each reception element 109a of the reception array 109 may convert the reception wave 107 into a reception signal. Further, by performing a phase control (beamforming) to the reception signal outputted from each reception element 109a, a narrow reception beam 1001 (also referred to as a reception beam 1001) may be formed as depicted in FIG. 10A. For instance, the signal processing part 111 may form the reception beam 1001. Thus, the reception signals in an area where the reception beam 1001 and at least one of beams 107a, 107b, and 107c corresponding to the beams 105a, 105b, and 105c respectively intersect may be extracted. In an embodiment, a direction of the reception beam 1001 may be changed in a direction 1003 (e.g., in the horizontal direction) by performing the phase controlling. Further, an incoming direction of the reception wave 107 may be calculated by the signal processing part 111 (not shown) in a first dimension (i.e. in the direction 1003) from the direction of the reception beam 1001. For instance, the direction of the reception beam 1001 may define the incoming direction of the reception wave 107 in the first dimension.

Further, a plurality of different frequency components (also referred to as frequency reception signals) from the reception signals may be extracted by the signal processing part 111. In an embodiment, each extracted frequency component may define an incoming direction of the reception wave 107 in a second dimension (i.e., in the direction 501). Indeed, as the emission direction corresponds to a given frequency and as the unique direction-frequency relationship is known by the signal processing part 111, extracting the frequency component from the reception signal enables to know the incoming direction of the reception wave 107. For instance, each extracted frequency component may correspond to a different incoming direction, since the transmission array 103 transmits the transmission wave 105 of beams of different directions at different frequencies, when base signal bs(t) is FM wave. Furthermore, a distribution of intensity data of the reception signals in the detection range where the reception beam 1001 intersects with each of the beams 107a, 107b, and 107c may be obtained, by plotting data based on an intensity of the reception signal at a distance position determined by a delay time of the reflection wave 107 in a direction defined by an angle in the direction 501 corresponding to the extracted frequency and in a direction defined by an angle in the direction 1003 acquired by the beamforming. Then, volume data that is distributed three-dimensionally in the detection range in the direction 501 and in the direction 1003 may be obtained, by changing the direction of the reception beam 1001 in the direction 1003 within the detection range and by acquiring the distribution of the intensity data at the respective directions of the reception beam 1001. Furthermore, visual data indicating a state of the at least one target may be generated based on the obtained volume data. Therefore, transmitting different frequencies in different emission directions with the 1D transmission array 103, and receiving the reception wave 107 with the 1D reception array 109 different from the transmission array and oriented in a different direction to the transmission array 103, enables three-dimensional target detection.

Figure 10B:
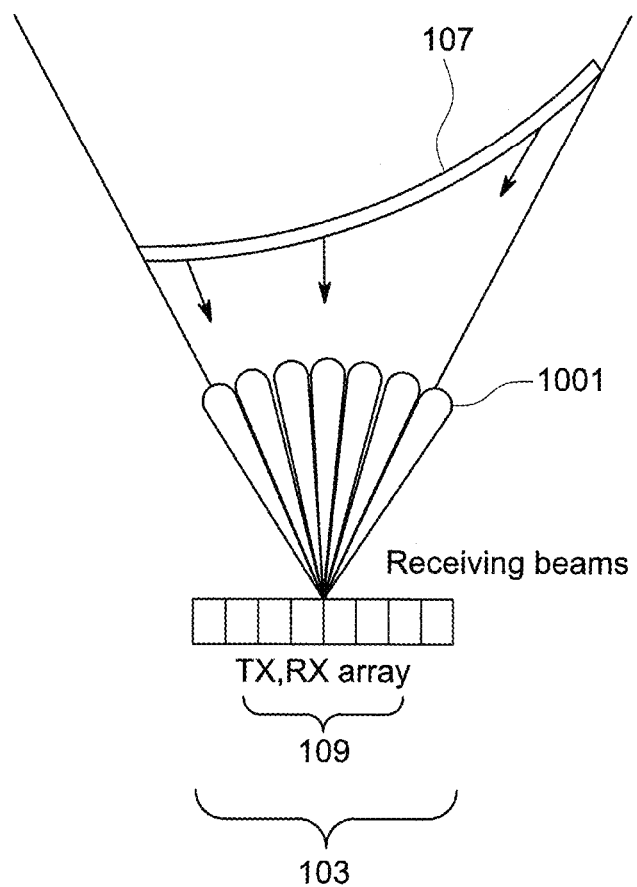
FIG. 10B illustrates the reception process for receiving the reception wave corresponding to the transmission wave when the transmission array and the reception array are arranged in parallel, in accordance with an example embodiment of the present invention.

FIG. 10B illustrates the reception process for receiving the reception wave 107 corresponding to the transmission wave when the transmission array 103 and the reception array 109 are arranged in parallel, in accordance with an example embodiment of the present invention. As illustrated in FIG. 10B, the reception wave 107 corresponding to the transmission wave 105 may approach the reception array 109. To that end, the reception array 109 having the plurality of reception elements 109a may receive the reception wave 107. Further, the reception beam 1001 may be formed by performing the phase control (beamforming) as explained in the detailed description of FIG. 10A. Since, the transmission wave 105 (e.g. the beams 105a, 105b, and 105c) and the reception beams 1001 are scanning the detection range in the same direction, a two-dimensional data set in the detection range may be acquired by changing the direction of the reception beam 1001. For instance, the two-dimensional data set comprise distance data where the reception beam 1001 intersects with the reception wave 107 corresponding to the transmission wave 105 and direction data in which the reception beam 1001 is changing.

In this way, the target detection device 100 may detect the targets for visualizing the underwater conditions in single transmission by using the narrow frequency band and the phase shift amount $\theta_n(t)$ for controlling the transmission wave 105 to propagate in the detection range. Further, a detailed block diagram of the target detection device 100 for detecting the targets and generating visual data of the targets is as explained in the detailed description of FIG. 11A.

Figure 11A:
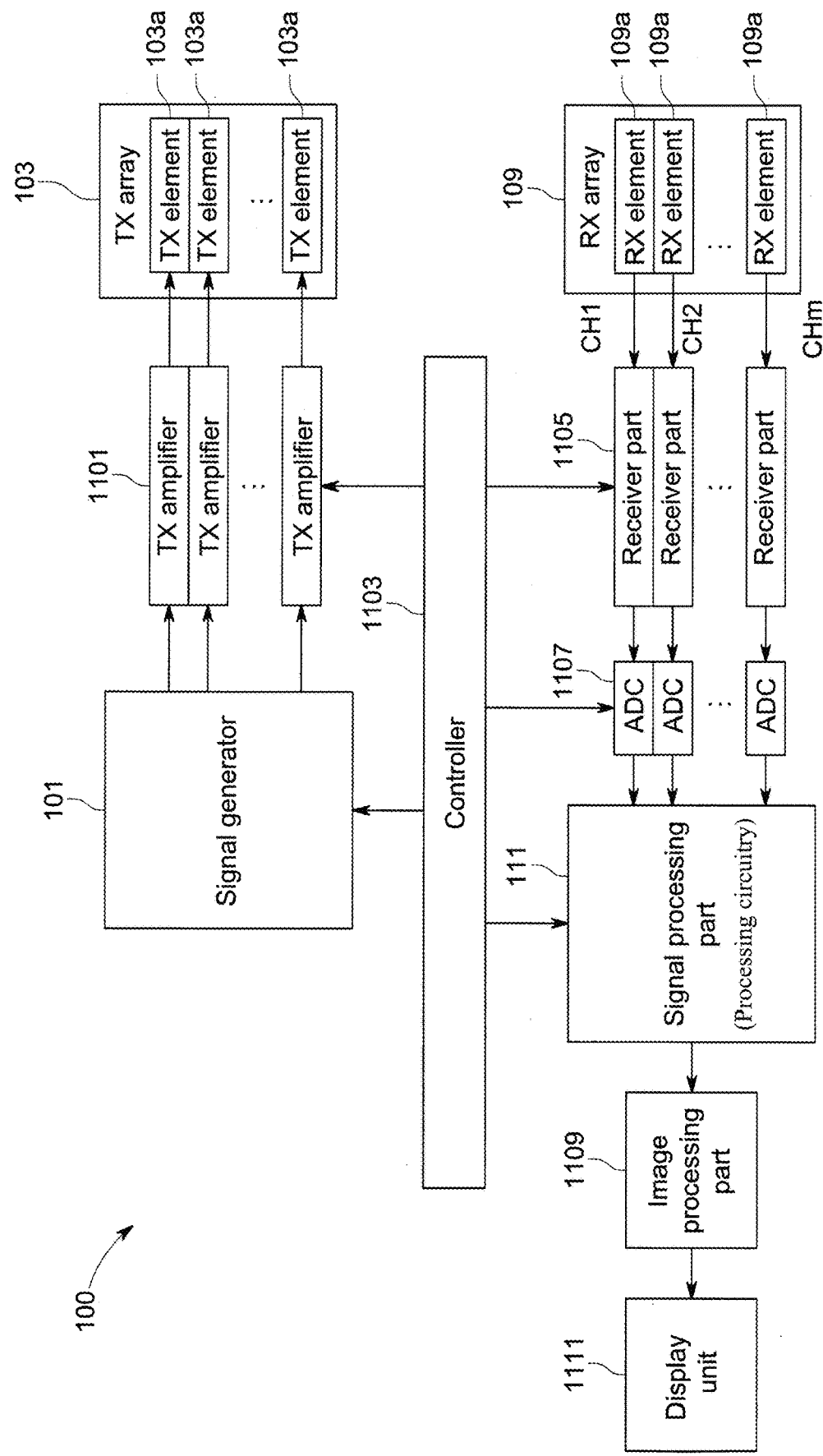
FIG. 11A is a block diagram of the target detection device for detecting the targets, in accordance with an example embodiment of the present invention.

FIG. 11A is a block diagram of the target detection device 100 for detecting the targets, in accordance with an example embodiment of the present invention. The target detection device 100 may include the signal generator 101 and the transmission array 103 as illustrated and explained in the detailed description of FIGS. 2A-2C. Additionally, the target detection device 100 may include a transmission amplifier 1101 connected between the signal generator 101 and the transmission array 103. The transmission amplifier 1101 may amplify the plurality of transmission signals $s_n(t)$ outputted from the signal generator 101 and supply it to each transmission element 103a.

Further, the target detection 100 may include a controller 1103. The controller 1103 may include an arithmetic processing circuit such as a CPU (Central Processing Unit), and a storage media such as a ROM (Read Only Memory), a RAM (Random Access Memory), and a hard disk drive. The controller 1103 may be comprised of an integrated circuit such as a FPGA (Field-Programmable Gate Array). The controller 1103 may cause the signal generator 101 to generate the plurality of transmission signals $s_n(t)$ as explained in the detailed description of FIGS. 2A-2C. Further, when these generated plurality of transmission signals $s_n(t)$ are inputted into the transmission array 103, the transmission array 103 may transmit the transmission wave 105 as the beams of different emission directions at different instant frequencies with time t according to the unique direction-frequency relationship. Therefore, the transmission wave 105 of FIG. 9A may be formed. The controller 1103 may also provide the unique direction-frequency relationship to the signal processing part 111.

The target detection device 100 may further comprise the reception array 109. In an embodiment, the reception array 109 may be arranged in a different direction to the transmission array 103 and may be for example perpendicularly arranged to the transmission array 103 as depicted in FIG. 9A. In an alternate embodiment, the reception array 109 may be arranged in parallel to the transmission array 103 as depicted in FIG. 9B, or at any other angle. The reception array 109 may comprise the plurality of reception elements 109a. Each of the reception elements 109a may be configured to receive the reception wave 107 and further configured to convert the reception wave 107 into the plurality of reception signals. The plurality of reception signals may be outputted from the plurality of reception elements 109a to corresponding channels CH1-CHm.

The target detection device 100 may further include a plurality of receiver parts 1105, a plurality of analog-to-digital converters (ADCs) 1107, the signal processing part 111, an image processing part 1109, and a display unit 1111, as a configuration for processing the plurality of reception signals outputted from each reception element 109a of the reception array 109 and for generating the visual data. The plurality of receiver parts 1105 may be connected to the channels CH1-CHm, respectively. Each receiver part 1105 may be as explained in the detailed description of FIG. 11B.

Figure 11B:
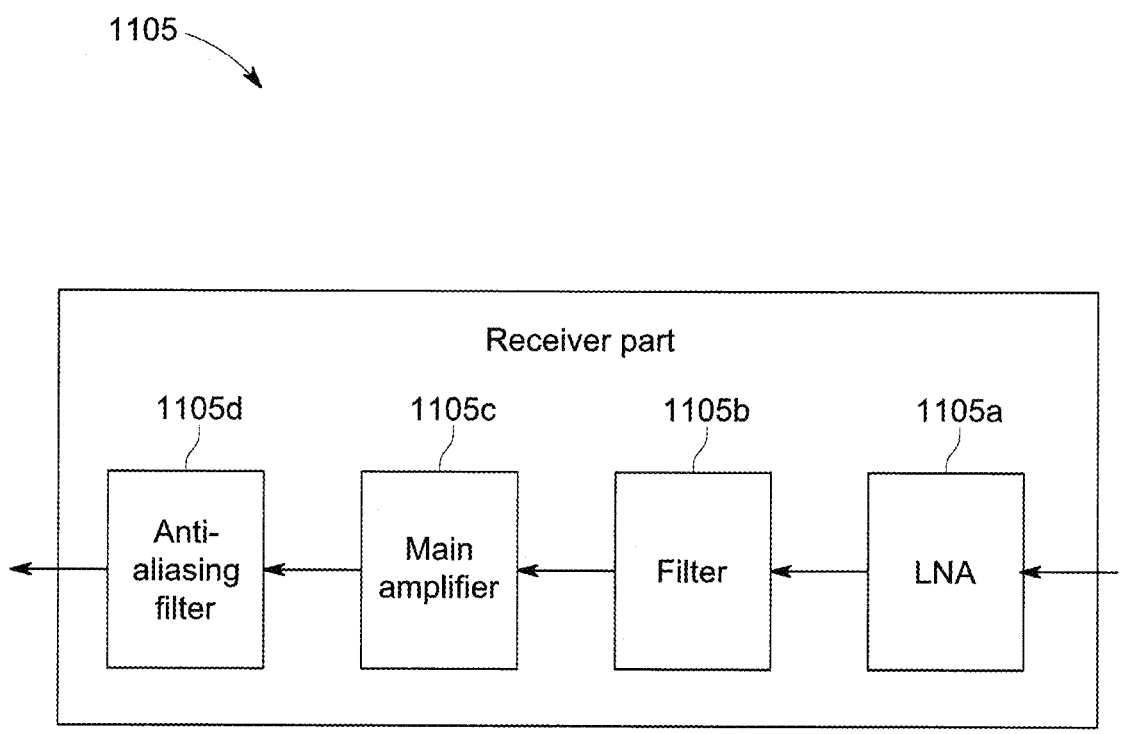
FIG. 11B illustrates a block diagram of a receiver part, in accordance with an example embodiment of the present invention.

FIG. 11B illustrates a block diagram of the receiver part 1105, in accordance with an example embodiment of the present invention. The receiver part 1105 is similar to reception part 100b of the target detection device 100 shown in FIG. 1. The receiver part 1105 may include a low noise amplifier (LNA) 1105a, a filter 1105b, a main amplifier 1105c, and an anti-aliasing filter 1105d. The LNA 1105a may amplify a low power reception signal outputted from the reception element 109a without degrading its signal-to-noise ratio. The filter 1105b may remove an unnecessary band from the inputted reception signal. The main amplifier 1105c may amplify the reception signal to a level suitable for A/D conversion. The anti-aliasing filter 1105d may remove a signal component at a band more than half of a sampling period of the A/D conversion.

Referring to FIG. 11A, the plurality of ADCs 1107 may be associated with the plurality of receiver parts 1105, respectively. Each ADC 1107 may convert the analog reception signal inputted from the corresponding receiver part 1105 into a digital signal at a given sampling period. The signal processing part 111 may process the reception signals of the channels CH1-CHm inputted from the plurality of ADCs 1107, respectively, to calculate the volume data of the reception signals that is distributed three-dimensionally over the detection range. The signal processing part 111 may be a single integrated circuit (FPGA etc.) together with the controller 1103.

The image processing part 1109 may process the volume data inputted from the signal processing part 111 and generate the visual data for visualizing the state of the at least one target in the detection range. For instance, the image processing part 1109 may perform operations such as a gain adjustment operation, an interference removal operation, a coordinate conversion (Spherical coordinate to Cartesian coordinate) operation, a pixel interpolation operation, a smoothing operation, a color conversion operation, and the like on the volume data to generate the visual data indicating the state of the at least one target. The image processing part 1109 may be embodied as a CPU, for example. The display unit 1111 may be comprised of a monitor for visualizing the underwater conditions according to the visual data inputted from the image processing part 1109.

Figure 12A:
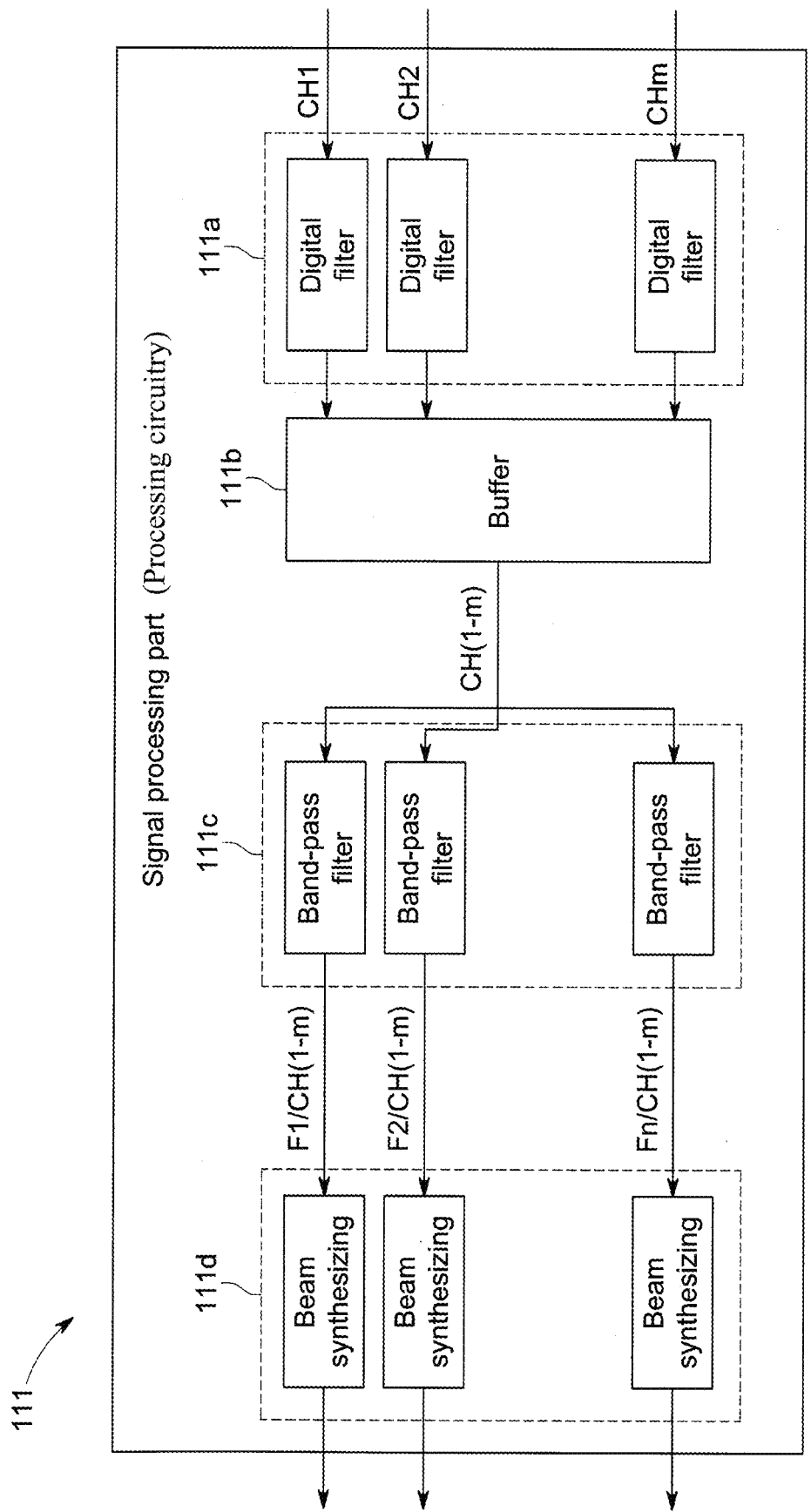
FIG. 12A illustrates a block diagram of the signal processing part for calculating the volume data, in accordance with an example embodiment of the present invention.

FIG. 12A illustrates a block diagram of the signal processing part 111 for calculating the volume data, in accordance with an example embodiment of the present invention. The signal processing part 111 may include a plurality of digital filters 111a, a buffer 111b, a plurality of band-pass filters 111c, and a plurality of beam synthesizing parts 111d (which may also be referred to as beam forming parts 111d). The plurality of digital filters 111a may be provided corresponding to the plurality of ADCs 1107 of FIG. 11A. The digital filter 111a may be a sharp digital filter for removing signals of unnecessary bands in the reception signal. The buffer 111b may temporarily hold the reception signals of the channels CH1-CHm outputted from the plurality of digital filters 111a. The buffer 111b may sequentially supply the reception signals for one scan to the plurality of band-pass filters 111c. Further, the buffer 111b may discard the reception signals after supplying the reception signals to the plurality of band-pass filters 111c. The plurality of band-pass filters 111c may extract the plurality of different frequency components (frequency receptions signals) at frequencies $F_1 i-F_n$ from the reception signals of one particular scan. The frequencies $F_1-F_n$ may correspond to the instant frequencies in the frequency range of the base signal bs(t). As each emission direction φ(t) has a different instant frequency f(t) as established according to the unique direction-frequency relationship, frequency characteristics of each band-pass filter 111c may be designed to match a frequency band in a given emission direction. To that end, each band-pass filter 111c may correspond to that given emission direction. In some embodiments, the plurality of band-pass filters 111c may be replaced with a plurality of compression filters (also referred to as matched filters) for extracting the plurality of frequency components. To that end, each compression filter may correspond to a given emission direction as established according to the unique direction-frequency relationship and frequency characteristics of compression filter may be designed to match a frequency band in that given emission direction. In case of the compression filter, the frequency band of the filter is generally larger than for a band-pass filter but the center frequency of the frequency band used for the design of each compression filter may be used as an entry point in the direction-frequency relationship to make the conversion from frequency to incoming direction. The use of plurality of compression filters enables providing a better range resolution. Further, the plurality of band-pass filters 111c (or the plurality of compression filters) may supply the extracted plurality of frequency components to the plurality of beam synthesizing parts 111d, respectively.

The plurality of beam synthesizing parts 111d may be provided corresponding to the plurality of band-pass filters 111c. As each beam synthesis part of the plurality of beam synthesis parts 111d corresponds to a given frequency within the frequencies $F_1-F_n$ each beam synthesis part corresponds to a given incoming direction of the reception wave 107 according to the unique direction-frequency relationship. The beam synthesizing part 111d may form the reception beam 1001 by the beam forming based on the phase control and separate the frequency component (i.e., the incoming direction of the reception wave 107) in the direction 501 at a given resolution. Thus, the frequency component in the area where the reception beam 1001 intersects with the at least one of the beams 107a, 107b, and 107c may be extracted. The extracted frequency component may change in the intensity on the time axis according to the intensity of the reflection wave 107 from the area where the reception beam 1001 intersects with the at least one of the beams 107a, 107b, and 107c. The time axis may correspond to a distance from the reception array 109 in the area where the reception beam 1001 intersects with the at least one of the beams 107a, 107b, and 107c. Therefore, the distribution of the intensity data in the area where the reception beam 1001 intersects with the at least one of the beams 107a, 107b, and 107c may be acquired by mapping each intensity on the time axis at the corresponding distance position from the reception array 109 in the area where the reception beam 1001 intersects with the at least one of the beams 107a, 107b, and 107c. Thus, the volume data where the intensity data is distributed three-dimensionally over the detection range may be acquired by integrating the distributions of the intensity data in each direction.

Figure 12B:
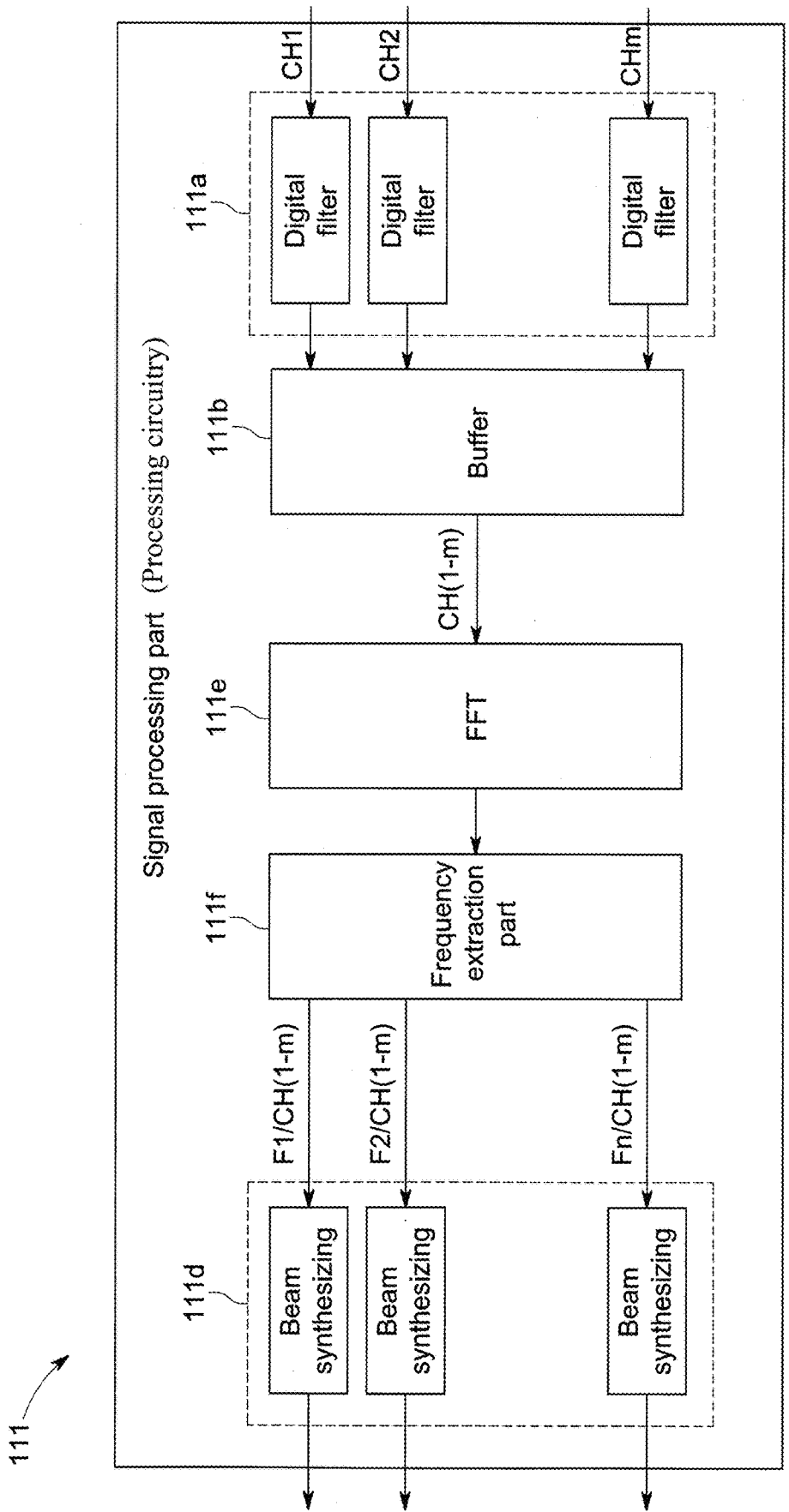
FIG. 12B illustrates a block diagram of the signal processing part for calculating the volume data, in accordance with an another example embodiment of the present invention.

FIG. 12B illustrates a block diagram of the signal processing part 111 for calculating the volume data, in accordance with another example embodiment of the present invention. In this example configuration, the plurality of band-pass filters 111c in the example configuration of FIG. 12A may be replaced by a Fast Fourier Transform (FFT) 111e and a frequency extraction part 111f. The FFT 111e may calculate a frequency spectrum from the reception signals for one scan of the channels CH1-CHm. The frequency extraction part 111f may extract the frequency components at the frequencies $F_1-F_n$ from the frequency spectrum of each channel calculated by the FFT 111e and supply the extracted frequency components to the corresponding beam synthesizing part 111d. Processing of the plurality of beam synthesizing parts 111d may be same as explained in the FIG. 12A. Further, the use of the FFT 111e and the frequency extraction part 111f enables to accurately extract the plurality of frequency components (i.e., the incoming direction of the reception wave 107) from the reception signals.

Also, according to this configuration, by integrating the distributions of the intensity data in each direction, outputted from beam synthesizing parts 111d, the volume data where the intensity data is distributed three-dimensionally over the detection range may be acquired as explained in the detailed description of FIG. 12A.

Figure 12C:
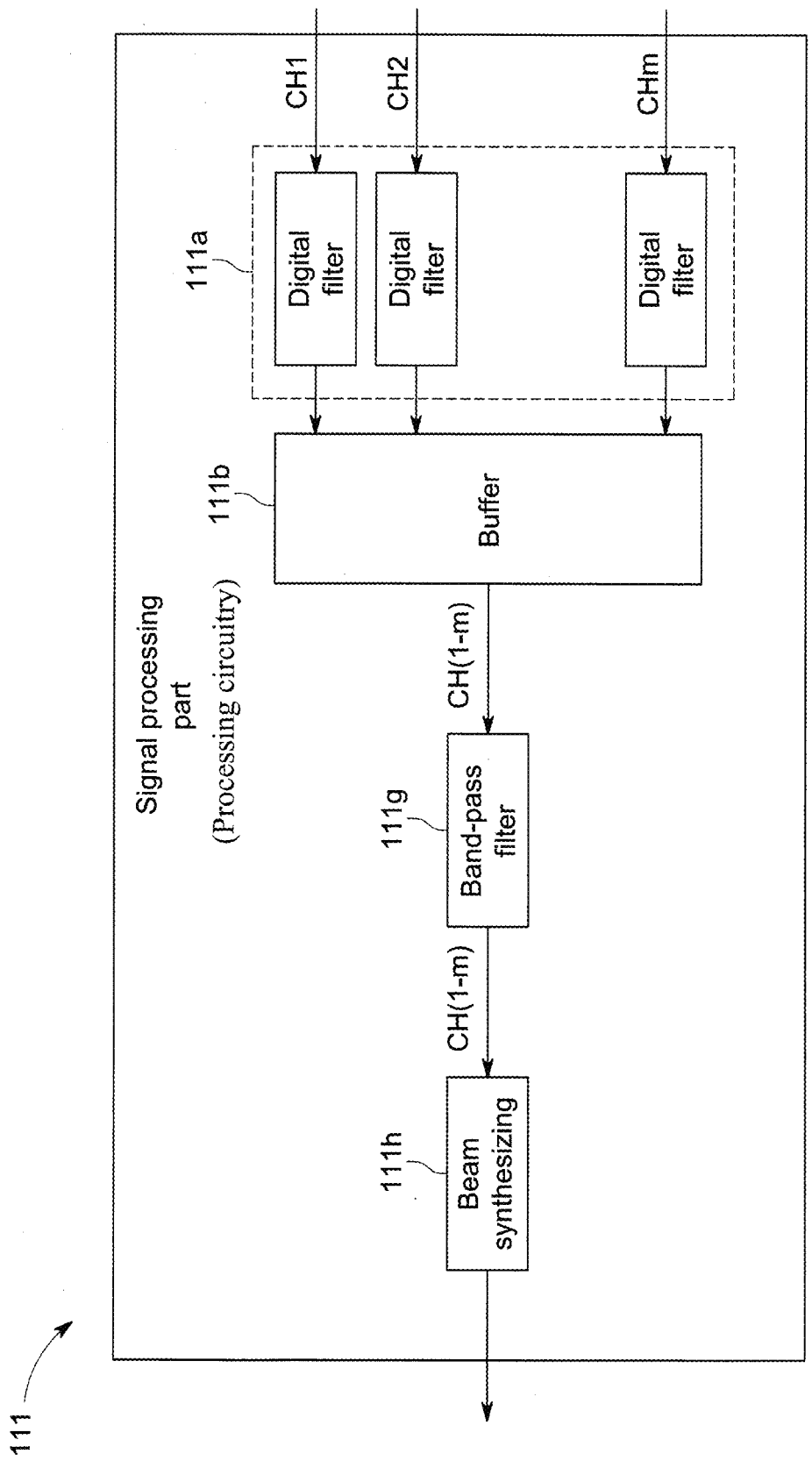
FIG. 12C illustrates a block diagram of the signal processing part when the base signal is the continuous wave, in accordance with yet another example embodiment of the present invention.

FIG. 12C illustrates a block diagram of the signal processing part 111 when the base signal bs(t) is the continuous wave, in accordance with yet another example embodiment of the present invention. In this example configuration, the plurality of band-pass filters 111c in the example configuration of FIG. 12A may be replaced by a single band-pass filter 111g and further the plurality of beam synthesizing parts 111d in the example configuration of the FIG. 12A may be replaced by a single beam synthesizing part 111h, as the instant frequency f(t) of the base signal bs(t) is the constant frequency when the base signal bs(t) correspond to the continuous wave. Processing of the single band-pass filter 111g may be same as the band-pass filter 111c explained in the detailed description of FIG. 12A. For instance, the single band-pass filter 111g may extract a single frequency component from the receptions signals, as the base signal bs(t) is the continuous wave. Processing of the single beam synthesizing part 111h may be same as the beam synthesizing part 111d as explained in the detailed description of FIG. 12A. For instance, the distribution of intensity data may be acquired in each direction defined by the direction 1003 by changing the direction of the reception beam 1001.

Figure 13A:
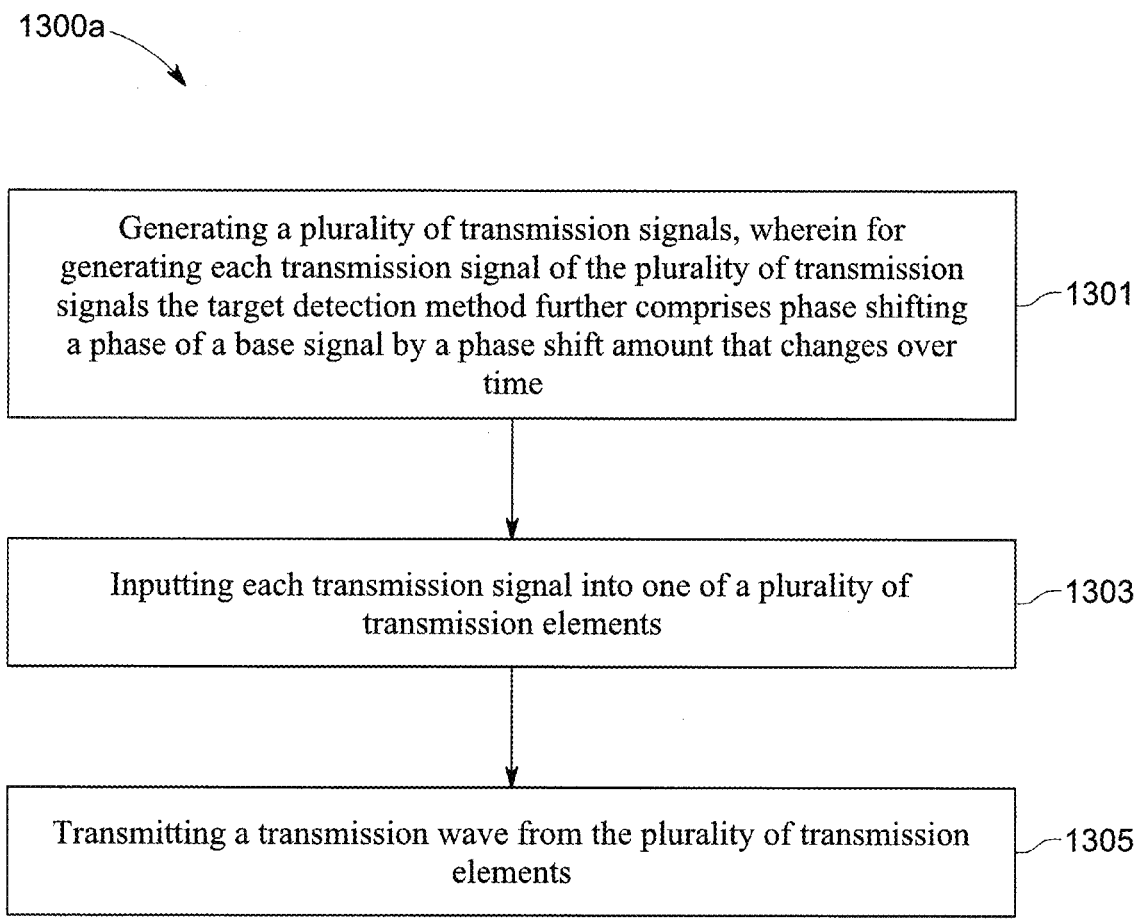
FIG. 13A illustrates a target detection method for transmitting the transmission wave, in accordance with an example embodiment of the present invention.

FIG. 13A illustrates a target detection method 1300a for transmitting the transmission wave 105, in accordance with an example embodiment of the present invention. The target detection method 1300a may be used in conjunction with the target detection device 100 described in the detailed description of FIG. 11A. Starting at step 1301, the target detection method 1300a may include generating the plurality of transmission signals $s_n(t)$. In an example embodiment, the target detection method 1300a may include phase shifting the phase of the base signal bs(t) by the phase shift amount $θ_n(t)$ that changes over the time t for generating each of the plurality of transmission signals $s_n(t)$. For instance, the signal generator 101 of the target detection device 100 may generate the plurality of transmission signals $s_n(t)$ as explained in the detailed description of FIGS. 2A-2C. Further, in some example embodiments, the phase shift amount $θ_n(t)$ applied to each of the plurality of transmission signal $s_n(t)$, relative to the base signal bs(t), may continuously vary with time t and the phase difference $\Delta\theta$ between any two transmission signals of the plurality of transmission signals may continuously vary with time t.

At step 1303, the target detection method 1300*a* may include inputting each transmission signal into one of the plurality of transmission elements 103*a*. For instance, the signal generator 101 may input each transmission signal into one of the plurality of transmission elements 103*a*.

At step 1305, the target detection method 1300*a* may include transmitting the transmission wave 105 from the plurality of transmission elements 103*a*. For instance, in response to inputting the plurality of transmission signals $s_n(t)$ into the plurality of transmission elements 103*a*, the transmission array 103*a* may transmit the transmission wave 105 as illustrated in FIG. 9A.

On implementing the target detection method 1300*a* on the target detection device 100, the transmission wave 105 of FIG. 9A may be formed. For instance, the transmission wave 105 may be the beams 105*a*, 105*b*, and 105*c* of different emission directions at different time instances and at different frequencies as explained in the detailed description of FIG. 9A. Accordingly, the target detection device 100 that implements the target detection method 1300*a* transmits the transmission wave 105 in the detection range. Further, the target detection device 100 that implements the target detection method 1300*a* enables to control the detection range of the transmission wave 105 using the phase shift amount $\theta_n(t)$ applied to the base signal bs(t), as each transmission signal is generated by phase shifting the phase of the base signal bs(t) by the phase shift amount $\theta_n(t)$. Therefore, the frequency of the base signal bs(t) may be selected independently without considering the detection range. Accordingly, the target detection device 100 that implements the target detection method 1300*a* transmits the transmission wave 105 in the detection range for detecting the targets in the single transmission using the narrow frequency band that is similar to the frequency band of the base signal bs(t).

Figure 13B:
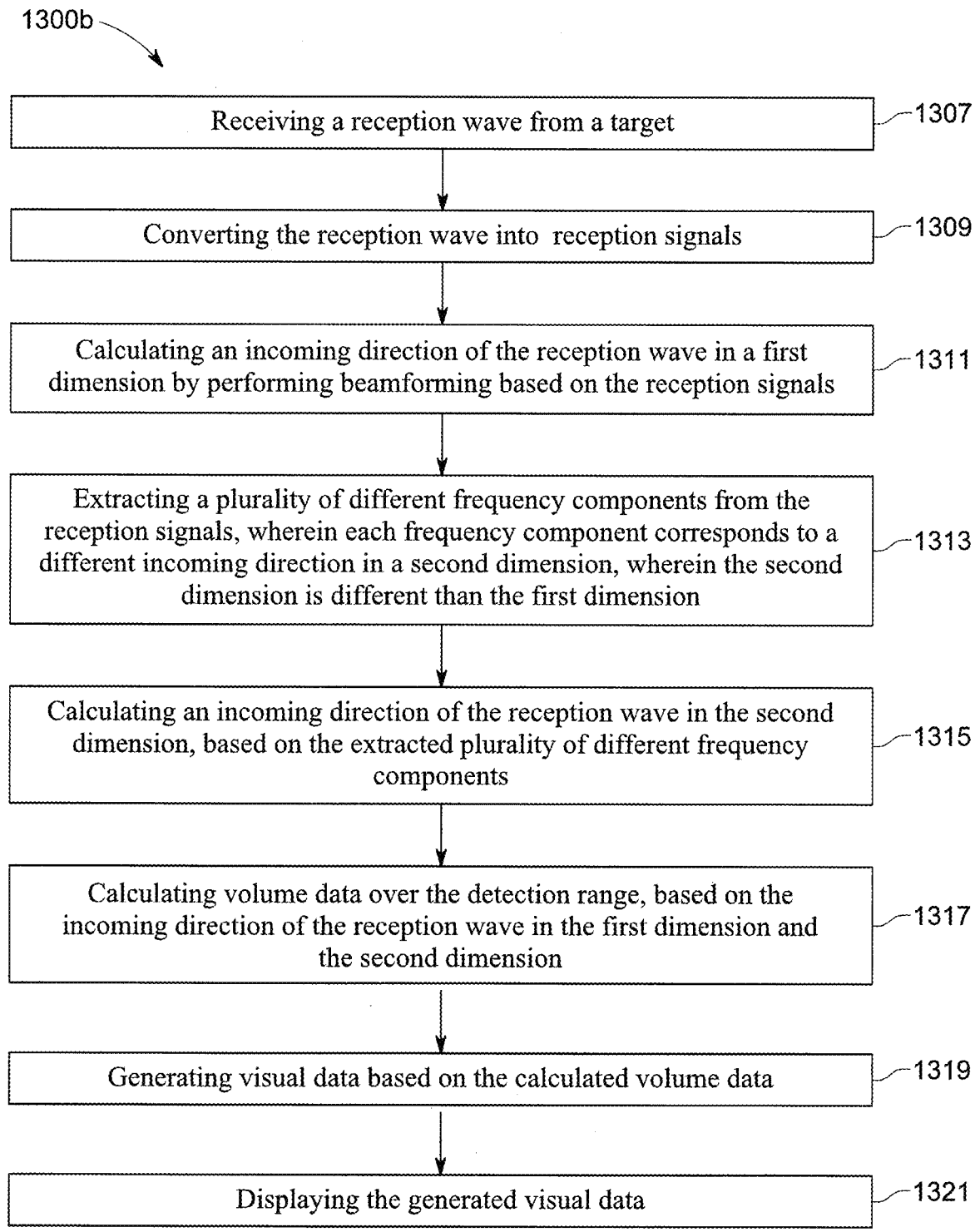
FIG. 13B illustrates a target detection method for processing the reception wave, in accordance with an example embodiment of the present invention.

FIG. 13B illustrates a target detection method 1300*b* for processing the reception wave 107, in accordance with an example embodiment of the present invention. The target detection method 1300*b* may be used in conjunction with the target detection device 100 described in the detailed description of FIG. 11A. Although various steps of the target detection method 1300*b* are described below and depicted in FIG. 13B, the steps need not necessarily all be performed, and in some cases may be performed in a different order than the order shown.

Starting at step 1307, the target detection method 1300*b* may include receiving the reception wave 107 from at least one target. For instance, the reception array 109 may receive the reception wave 107 from at least one target. The reception wave 107 may be the wave reflected from the at least one target, in response to transmitting the transmission wave 105.

At step 1309, the target detection method 1300*b* may include converting the reception wave 107 into the plurality of reception signals. For instance, each reception element 109*a* of the reception array 109 may convert the reception wave 107 into the reception signal.

At step 1311, the target detection method 1300*b* may include calculating the incoming direction of the reception wave 107 in a first dimension by performing the beamforming on the reception signals. For instance, the signal processing part 111 may calculate the incoming direction of the reception wave 107 in the direction 1003 by phase controlling the reception beam 1001 as explained in the detailed description of FIG. 10A.

At step 1313, the target detection method 1300*b* may include extracting the plurality of different frequency components from the reception signals. For instance, the signal processing part 111 may extract the plurality of different frequency components from the reception signals as explained in the detailed description of FIG. 10A. As each emission direction $\varphi(t)$ has a different instant frequency f(t) as established according to the unique direction-frequency relationship, each frequency component may correspond to a different incoming direction in the second dimension (e.g., in the direction 501).

At step 1315, the target detection method 1300*b* may include calculating the incoming direction of the reception wave 107 in the second dimension, based on the extracted plurality of different frequency components and the unique direction-frequency relationship. For instance, the signal processing part 111 may calculate the incoming direction of the reception wave 107 in the direction 501, based on the extracted plurality of different frequency components. In an example embodiment, each frequency component may define the incoming direction in the direction 501, as each emission direction $\varphi(t)$ has a different instant frequency f(t) as established according to the unique direction-frequency relationship.

At step 1317, the target detection method 1300*b* may include calculating the volume data over the detection range, based on the incoming direction of the reception wave 107 in the first dimension and the second dimension. For instance, the signal processing part 111 may obtain the distribution of the intensity data by mapping the intensity data of the reception signal in the detection range and calculate the volume data over the detection range based on the distribution of the intensity data as explained in the detailed description of FIG. 10A.

At step 1319, the target detection method 1300*b* may include generating the visual data based on the calculated volume data. For instance, the image processing part 1109 may generate the visual data based on the volume data. The visual data may indicate the state of the at least one target.

At step 1321, the target detection method 1300*b* may include displaying the generated visual data. For instance, the visual data may be displayed via the display unit 1111 for visualizing the underwater conditions.

On implementing the target detection method 1300*b* on the target detection device 100, the target detection device 100 may process the reception wave 107 corresponding to the transmission wave 105. Since the transmission wave 105 corresponds to the beams 105*a*, 105*b*, and 105*c* of different emission directions at different time instances and at different frequencies, the target detection device 100 that implements the target detection method 1300*b* may smoothly detect the targets. For instance, echoes (e.g., beams of the transmission wave 105 reflected from the at least one target) may be smoothly separated to detect the targets, as the transmission wave 105 corresponds to the beams 105*a*, 105*b*, and 105*c* of different emission directions at different time instances and at different frequencies. For instance, transmitting different frequencies in different emission directions with the 1D transmission array 103, and receiving the reception wave 107 with the 1D reception array 109 different from the transmission array 103 and oriented in a different direction to the transmission array 103, enables three-dimensional target detection without the need for a 2D transmission array or a 2D reception array. Since the transmission wave 105 is transmitted using the narrow frequency band, the target detection device 100 that implements the target detection method 1300b may allow visualizing of the underwater conditions based on the detected targets using the narrow frequency band.

Figure 14:
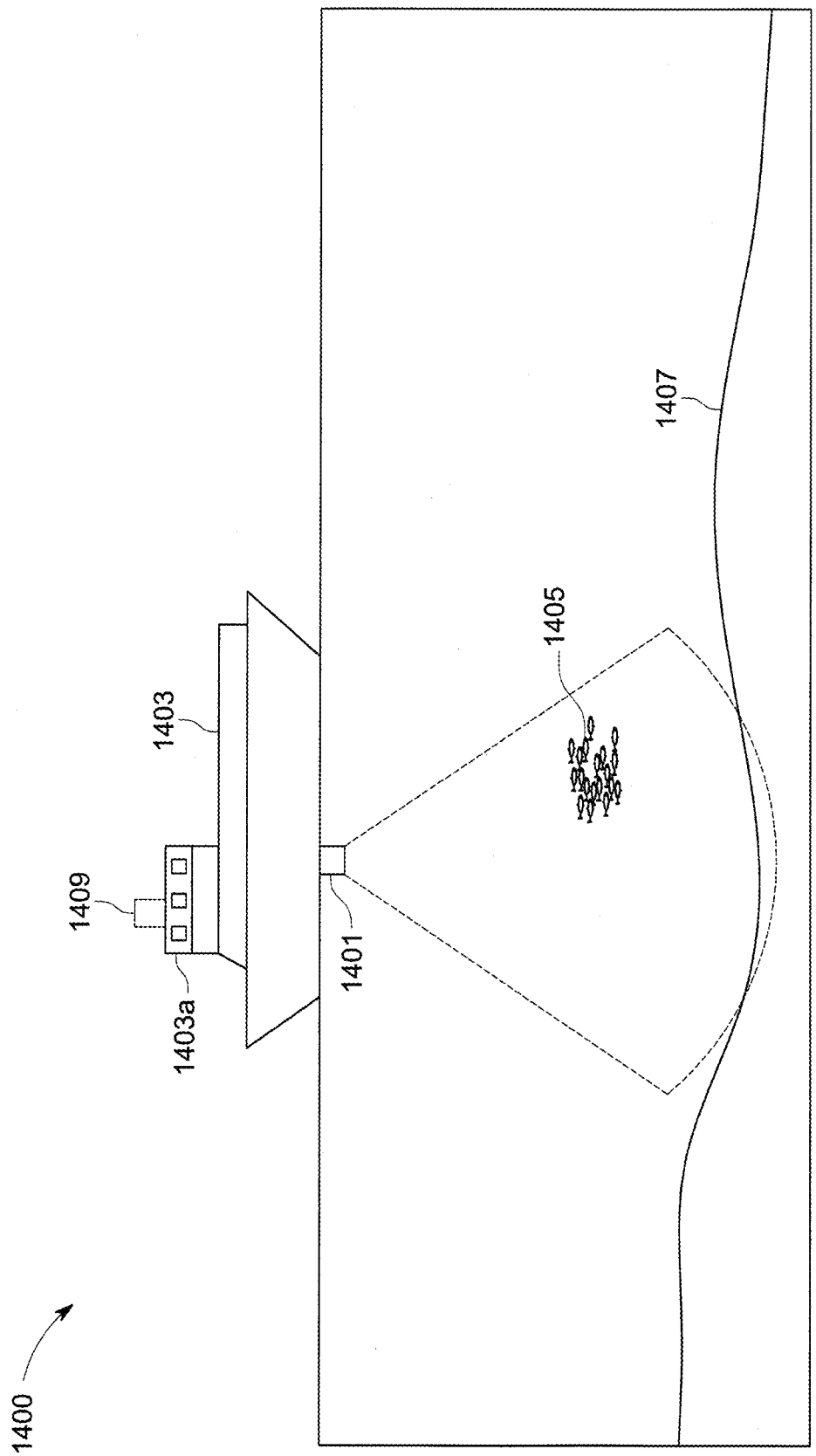
FIG. 14 illustrates a working environment of the target detection device for detecting the targets, in accordance with an example embodiment of the present invention.

FIG. 14 illustrates a working environment of the target detection device 100 for detecting the targets, in accordance with an example embodiment of the present invention. In an embodiment, the target detection device 100 may be a sonar for detecting the targets in the water body. To that end, a transducer 1401 may be installed on bottom of a vessel 1403. The transducer 1401 may include the transmission array 103 and the reception array 109. The transmission array 103 may transmit the transmission wave 105 underwater in response to generating the plurality of transmission signals $s_n(t)$ by the signal generator 101. For instance, an acoustic wave (e.g., an ultrasonic wave) may be transmitted as the transmission wave 105 by the transmission array 103 of the transducer 1401.

Configurations of FIG. 11A other than the transmission array 103, the reception array 109, and the display unit 1111 may be provided to a control device (not shown in figure) installed in a control room 1403a of the vessel 1403. The display unit 1111 may be installed in the control room 1403a, separately from the control device. The display unit 1111 may also be integrally provided with the control device. Further, a detection image indicative of a situation of a fish school 1405, a seabed 1407, and the like may be displayed on the display unit 1111. Therefore, a user can grasp the underwater conditions. In some embodiments, four transducers 1401 which are directed forward, rearward, leftward, and rightward may be installed on the bottom of the vessel 1403. In this case, each transducer 1401 comprising the transmission array 103 and the reception array 109 may be configured as explained in the detailed description of FIG. 11A. To that end, a detection image of entire underwater from the vessel 1403 may be displayed on the display unit 1111.

In an alternate embodiment, the target detection device 100 may be a radar for detecting targets in air. To that end, a transducer 1409 may be installed in an upper part of the control room 1403a, as illustrated in the FIG. 14. The transducer 1409 may include the transmission array 103 and the reception array 109. The transmission array 103 may transmit the transmission wave 105 in the air in response to generating the plurality of transmission signals $s_n(t)$ by the signal generator 101. For instance, a radio wave may be transmitted as the transmission wave 105 by the transmission array 103 of the transducer 1409. Further, a circuitry configuration for the transducer 1409 may be installed in the control room 1403a, similarly as explained for the transducer 1401. Further, a detection image indicative of a situation of an obstacle and a flock of birds may be displayed on the display unit 1111. Accordingly, the user may grasp the situation in the air. In some embodiments, the transducer 1409 may be installed on each of front, rear, right and left side surfaces of the control room 1403a. In this case, each transducer 1409 comprising the transmission array 103 and the reception array 109 may be configured as explained in the detailed description of FIG. 11A. To that end, a detection image of an airspace surrounding the vessel 1403 may be displayed on the display unit 1111.

Many modifications and other embodiments of the inventions set forth herein will come to mind of one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

TERMINOLOGY

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A target detection device, comprising:
   an underwater acoustic transmission array having a plurality of underwater acoustic transmission transducer elements; and
   a signal generator configured to:
   generate a plurality of transmission signals,
   wherein, to generate each transmission signal of the plurality of transmission signals, the signal generator is further configured to change a phase of a base signal over time in accordance with one of a plurality of linear or non-linear phase shift/time relationships that include no discontinuities, each of the plurality of linear or non-linear phase shift/time relationships corresponding to a respective one of the plurality of transmission signals;
   input to each underwater acoustic transmission transducer element of the plurality of underwater acoustic transmission transducer elements a corresponding generated transmission signal of the plurality of transmission signals; and
   transmit an underwater acoustic transmission wave from the underwater acoustic transmission array, the underwater acoustic transmission wave corresponding to the plurality of transmission signals.

2. The target detection device of claim 1, wherein the signal generator linearly or non-linearly changes the phase of the base signal such that:
   a first phase shift amount of a first transmission signal of the plurality of transmission signals at a first time is different from a second phase shift amount of the first transmission signal at a second time,
   the first phase shift amount and the second phase shift amount are measured with respect to the phase of the base signal, and
   the first time is different from the second time.

3. The target detection device of claim 2, wherein the signal generator linearly or non-linearly changes the phase of the base signal such that:
a third phase shift amount of a second transmission signal of the plurality of transmission signals at the first time is different from the first phase shift amount of the first transmission signal at the first time,
the third phase shift amount and the first phase shift amount are measured with respect to the phase of the base signal, and
the second transmission signal is different from the first transmission signal.

4. The target detection device of claim 3, wherein a first phase difference between the first transmission signal and the second transmission signal at the first time is different from a second phase difference between the first transmission signal and the second transmission signal at the second time.

5. The target detection device of claim 1, wherein the signal generator is further configured to linearly or non-linearly change the phase of the base signal for each transmission signal of the plurality of transmission signals so as to change an emission direction of the underwater acoustic transmission wave transmitted by the underwater acoustic transmission array over said time.

6. The target detection device of claim 5,
wherein a carrier of the base signal is a frequency modulated carrier, and
wherein a frequency of the underwater acoustic transmission wave changes over said time in response to the change in the emission direction of the underwater acoustic transmission wave over said time.

7. The target detection device of claim 5, wherein the emission direction of the underwater acoustic transmission wave changes non-linearly with time.

8. The target detection device of claim 1, wherein a carrier of the base signal is a single frequency carrier.

9. The target detection device of claim 1, further comprising an underwater acoustic reception array having a plurality of underwater acoustic reception elements,
wherein the underwater acoustic reception array is configured to receive an underwater acoustic reception wave from a target, the underwater acoustic reception wave being based on the underwater acoustic transmission wave,
wherein each underwater acoustic reception element of the plurality of underwater acoustic reception elements is configured to convert the underwater acoustic reception wave into a corresponding reception signal.

10. The target detection device of claim 9, further comprising a processing circuitry configured to calculate an incoming direction of the underwater acoustic reception wave in a first dimension by performing beam forming based on the received reception signals.

11. The target detection device of claim 10, wherein the processing circuitry is further configured to extract frequency components from the reception signals to obtain a second incoming direction of the underwater acoustic reception wave, different from the incoming direction, based on a direction-frequency relationship between emission directions of the underwater acoustic transmission wave transmitted by the underwater acoustic transmission array and a frequency of the underwater acoustic transmission wave transmitted by the underwater acoustic transmission array, and to generate 3D volume data based on the received reception signals, the incoming direction and the second incoming direction.

12. The target detection device of claim 10, wherein the processing circuitry is further configured to:
extract a plurality of different frequency components from the reception signals,
wherein each frequency component of the plurality of different frequency components corresponds to a different incoming direction in a second dimension, and
wherein the second dimension is different than the first dimension; and
calculate an incoming direction of the underwater acoustic reception wave in the second dimension, based on the extracted plurality of different frequency components.

13. The target detection device of claim 9, wherein directions of arrangement of the plurality of underwater acoustic transmission transducer elements and the plurality of underwater acoustic reception elements are perpendicular.

14. The target detection device of claim 1,
wherein the plurality of transmission signals comprises a first, second and third transmission signal,
wherein the plurality of linear or non-linear phase shift/time relationships that include no discontinuities comprises a first, second and third linear or non-linear phase shift/time relationship corresponding to the first, second and third transmission signals, respectively,
wherein two of the first, second and third linear or non-linear phase shift/time relationships have a positive slope while another of the first, second and third linear or non-linear phase shift/time relationships has a negative slope, or
wherein two of the first, second and third linear or non-linear phase shift/time relationships have a negative slope while another of the first, second and third linear or non-linear phase shift/time relationships has a positive slope.

15. The target detection device of claim 14, wherein the first, second and third linear or non-linear phase shift/time relationships intersect at a common time point.

16. The target detection device of claim 14, wherein none of the first, second and third linear or non-linear phase shift/time relationships has a zero slope.

17. The target detection device of claim 1, wherein the plurality of linear or non-linear phase shift/time relationships that include no discontinuities comprise a plurality of linear phase shift/time relationships that include no discontinuities.

18. The target detection device of claim 1, wherein the plurality of linear or non-linear phase shift/time relationships that include no discontinuities comprise a plurality of non-linear phase shift/time relationships that include no discontinuities.

19. A target detection method performed by a target detection device having an underwater acoustic transmission array comprising a plurality of underwater acoustic transmission transducer elements, the target detection method comprising:
generating a plurality of transmission signals,
wherein, for generating each transmission signal of the plurality of transmission signals, the target detection method further comprises changing a phase of a base signal over time in accordance with one of a plurality of linear or non-linear phase shift/time relationships that include no discontinuities, each of the plurality of linear or non-linear phase shift/time relationships corresponding to a respective one of the plurality of transmission signals;

inputting a corresponding generated transmission signal of the plurality of transmission signals into one of the plurality of underwater acoustic transmission transducer elements; and transmitting an underwater acoustic transmission wave from the underwater acoustic transmission array, the underwater acoustic transmission wave corresponding to the plurality of transmission signals.

20. The target detection method of claim 19, wherein a phase shift amount of each transmission signal of the plurality of transmission signals, with respect to the phase of the base signal, varies continuously over the time, and a phase difference between any two transmission signals of the plurality of transmission signals varies continuously over the time.

\* \* \* \* \*